(12) United States Patent
Dennison et al.

(10) Patent No.: US 7,735,036 B2  
(45) Date of Patent: Jun. 8, 2010

(54) SYSTEM AND METHOD ENABLING CIRCUIT TOPOLOGY RECOGNITION WITH AUTO-INTERACTIVE CONSTRAINT APPLICATION AND SMART CHECKING

(75) Inventors: Ian Campbell Dennison, Edinburgh (GB); Mark Baker, Kinross (GB); Bogdan Arsintescu, Santa Clara, CA (US); Donald John O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 49 days.

(21) Appl. No.: 11/745,983

(22) Filed: May 8, 2007

(65) Prior Publication Data

US 2008/0282212 A1 Nov. 13, 2008

(51) Int. Cl.
*G06F 17/50* (2006.01)
*G06F 9/45* (2006.01)

(52) U.S. Cl. ........................ 716/5; 716/3; 716/4; 716/7; 716/8; 716/9; 716/10; 716/18

(58) Field of Classification Search ............... 716/1–18
See application file for complete search history.

(56) References Cited

U.S. PATENT DOCUMENTS

| 6,470,486 B1* | 10/2002 | Knapp | 716/18 |
| 6,988,253 B1* | 1/2006 | Lipton et al. | 716/5 |
| 7,418,683 B1* | 8/2008 | Sonnard et al. | 716/5 |
| 2004/0019869 A1* | 1/2004 | Zhang | 716/11 |
| 2008/0092099 A1* | 4/2008 | Lin et al. | 716/8 |

\* cited by examiner

*Primary Examiner*—Jack Chiang
*Assistant Examiner*—Nghia M Doan
(74) *Attorney, Agent, or Firm*—Stephen C. Durant

(57) ABSTRACT

A computer-implemented method of identifying sub-circuits in circuit designs includes: receiving a selection of a sub-circuit; specifying a match expression for the sub-circuit, where the match expression characterizes matching properties of components of the sub-circuit; modifying the match expression to change the matching properties of components of the sub-circuit; and producing an information structure in a computer readable medium, where the information structure associates a graph representing a topology of the selected sub-circuit with the modified match expression. Subsequently, the information structure corresponding to the selected sub-circuit can be identified in a given circuit design.

26 Claims, 18 Drawing Sheets

SYSTEM AND METHOD ENABLING CIRCUIT TOPOLOGY RECOGNITION WITH AUTO-INTERACTIVE CONSTRAINT APPLICATION AND SMART CHECKING

BACKGROUND OF THE INVENTION

1. Field of the Invention

The invention relates to the design of electronic circuits and more particularly to association of constraints with design objects in electronic circuit designs.

2. Description of the Related Art

Electronic Design Automation (EDA) tools are computer software programs used to design electronic circuits. A suite of EDA tools may be used to convert a circuit design idea to a physical design including logic gates, circuit components and their interconnections. A circuit designer typically uses an EDA tool to create a schematic design of a circuit. The designer may use other FDA tools from the suite to convert the schematic to a physical layout, which specifies the shapes, positions, and dimensions of semiconductor and conductor materials such as silicon and metal. The EDA design tools can be used to in essence, translate a schematic design to a physical layout using layout rules, which specify, for example, that a particular type of transistor is to have particular dimensions and be a particular distance from other transistors in the physical layout. The physical layout can be fabricated to produce a physical implementation, which typically involves a semiconductor integrated circuit (IC) chip or printed circuit board (PCB). The integrated circuit may be, for example, an analog circuit such as an amplifier, a digital circuit such as a microprocessor, or a combination analog and digital circuit, such as a cellular telephone radio.

In one approach to circuit design, a designer creates a visual representation of a circuit design on a design canvas. A design canvas typically comprises a computer generated two-dimensional interactive user interface screen display area produced with the help of an EDA tool. The EDA tool encodes a computer system to produce the user interface that allows a designer to create such a schematic diagram by adding representations of design objects, which comprise data code structures encoded in a computer readable medium that correspond to graphical icons that represent physical circuit elements such as, transistors, resistors, digital logic gates, and other devices to the design canvas. The EDA tool user interface also may allow the designer to modify an existing schematic design by modifying existing design objects on the canvas, by adding new design objects to the canvas, and by modifying or adding connections between the design objects on the canvas. Connections between design objects in the schematic generally represent physical electrical connections between circuit elements of a circuit under development.

Design annotations can be used to communicate design intent among designers and between design tools. A design annotation may include one or more data values such as parameter values for layout rules. The data values may be, for example, text in a format that is readable by humans or by machines. A design annotation also may include one or more names associated with data values e.g., to identify specific parameters to which the data values correspond. Design annotations typically are created by a user via an EDA tool user interface or by a programming script, and are typically associated with particular design objects. Design annotations that can be recognized by a design tool or by a fabrication process are called "constraints".

Constraint-driven design is a state-of-the-art technique for productivity enhancement in modern design automation software. A design constraint in the FDA context generally refers to a requirement imposed upon the layout of a circuit or upon the structure of circuit elements corresponding to design objects that cannot be directly captured in design parameters and that may be beyond process design rules. For example, a constraint may be imposed to help reduce second-order effects such as parasitics and to increases the likelihood that a design will meet design specifications in a smaller number of design iterations. Constraints also serve as a mechanism whereby designers can bring their own knowledge to bear to achieve design flow consistency and to achieve viable circuit structures. A constraint can be associated with one or more design objects, typically by a designer who wishes to specify information about a design object for the purpose of, for example, overriding default layout parameters provided by a base EDA tool. Moreover, for example, a constraint can specify a process parameter for use in a fabrication process in the course of fabricating an actual physical circuit based upon the design.

A design tool at one stage of an overall chip design, layout, and manufacturing process can be used to create a constraint that can be used as an input to a design tool at a different later stage of the overall design process. For instance, during an earlier design stage, a user may associate a symmetry constraint with two design objects to specify that devices corresponding to the two design objects are to be positioned with a particular orientation relative to each other. The orientation may be specified by the value of a symmetry constraint. During a layout stage, which ordinarily occurs later in the overall design process, a layout design tool may recognize the symmetry constraint and act on that constraint by laying out the devices with the specified symmetry relationship. Specifically, for example, two symmetrically constrained design objects may be laid out symmetrically (about some axis) with respect to each other within the overall circuit layout. Effectively, two objects in the design are constrained to be physically implemented as mirror images of each other. A symmetrical placement greatly increases the chances of these devices operating more identically in a practical IC manufacturing process, which tends to include variations from one device to the next. Symmetrical placement reduces the variations, and is but one example of a large number of possible constraint relationships that can be designed to achieve high yielding designs.

With the increasing complexity of custom circuit design technology, concepts like constraint-driven, connectivity-driven, and design rule-aware layout have been adopted in both in IC and PCB EDA tool domains. These capabilities generally allow multiple designers to manually encode design constraints at various stages of a design flow. Thus, designers can manually intervene in the automated design process to ensure correct connectivity and to automatically prevent design rule errors, for example. Unfortunately, today's design and manufacturing processes have significantly evolved in complexity, which when coupled with smaller device geometries, the growth in design complexity, ever increasing numbers of design rules, and a huge numbers of constraints, have contributed to a deluge of information—far too much to be entered and managed manually. Correctly creating the large number of constraints and associated them with design objects in the first place remains a significant problem.

In the past, constraints often have been manually associated with design objects representing circuit elements such as circuit instances, wires, pins, and groups of these. This earlier approach often required designers to first manually find/identify those sub-circuits which are to be constrained, to subsequently apply (again, manually) a set of constraints to those, before finally (again, manually) setting the correct values for constraint parameters. By sub-circuits, it is meant circuits that are a part of a larger circuit. All three steps can be error prone, meaning lack of accuracy, speed, and repeatability. In the past, there often was insufficient verification that the correct constraints had been added between the right devices and/or nets, that constraints had been added consistently and uniformly, and that constraint parameters had the correct values. Basically, a manual approach to the assignment of constraints often was fraught with errors. Junior designers in particular are prone to making such mistakes, which can result in non-yielding or non-fictional silicon, with significant re-mask costs incurred to correct the problem.

Recent improvements in this art include the use of a 'constraint assistant' software tool that can automatically identify occurrences of specific sub-circuits, which are then presented to a designer along with a suggestion of specific constraints that he or she may wish to annotate onto those sub-circuits. Unfortunately, that approach is limited. Typically, it can find only instances of a limited set of hard-coded topologies coded into the software by the vendor, and with those, can associate only a given limited set of (again hard-coded) constraints. Such hard-coded induced limitations become a problem for today's rapidly changing processes, and rapidly changing design specifications during a circuit design and implementation. Hard-coding a limited set of constraints and sub-circuits to which they may apply, is an insufficient approach to keep pace with changes and variations in design requirements after a customer has purchased and installed the EDA tool software.

Other earlier approaches have attempted to automatically analyze a circuit topology using algorithms such as signal flow (e.g., identification of the main signal flow paths in a circuit, typically from input to output such as is common for digital circuits) or by circuit equation generation. These approaches attempt to deduce circuit functionality and to automatically infer an appropriate set of constraints to enable such a circuit to be correctly manufactured with high yield. Unfortunately, such automated approaches generally do not scale well to today's complex designs and processes, and such automatically inferred set of constraints often cannot keep pace with the ever evolving process requirements.

In addition, equation based approaches often are insufficient due to attempts to model all circuit behaviors to high order polynomials (first or second order polynomials are insufficient in many cases), including non-essential behaviors, and then to attempt to appropriately constrain those. Other problems often associated with a fully automated approach to constraint assignment include errors resulting in either under or over-constrained designs, and software performance issues, as the algorithms often do not scale well to the vast number of constraints sometimes employed in today's high performance analog circuits for example, limiting the usefulness of such algorithms.

Thus, there has been a need for improvement in the creation and distribution of constraints within a circuit design whether involving an IC or a PCB. More particularly, there has been a need for improvements to both manual and automatic aspects of the creation and distribution of constraints within a design and to the coordination between these aspects. The present invention meets this need.

SUMMARY OF THE INVENTION

In one aspect, a computer implemented method and associated system are provided for interactive application of constraints to sub-circuits in a circuit design stored in a computer readable medium. A designer's selection of a sub-circuit is received. A designer's instruction to modify a topology of the selected sub-circuit is received. The modified topology is used to identify sub-circuit instances in the circuit design having the same topology as the modified topology.

Another aspect the invention advantageously permits a first designer to specify a sub-circuit type based upon topology and match criteria and to propose constraints applicable to the specified sub-circuit type. A graph-based search process automatically identifies sub-circuits that match the topology of the sub-circuit type in a design context. A match process automatically identifies corresponding sub-circuits with matching topologies that possess properties specified by the first designer in the design context. A second designer decides whether to actually apply the proposed constraints to individual instances of the sub-circuit type within the design context.

Yet another aspect of the invention provides an article of manufacture and a system involving a process to produce a computer generated display an interactive schematic diagram canvas to receive user selection of a sub-circuit from within a circuit design displayed on the canvas. The process also produces a computer generated display to receive user instruction to modify a topology of the selected sub-circuit. The process further produces a computer generated display a user readable representation of the modified topology. In response to a user request directed to the user readable representation, the modified topology is used to identify sub-circuit instances in a circuit design having the same topology as the modified topology.

These and other features and advantages of the invention will become more apparent from the following more detailed description of embodiments thereof, in conjunction with the appended drawings.

DETAILED DESCRIPTION OF THE PREFERRED EMBODIMENTS

Figure 1:
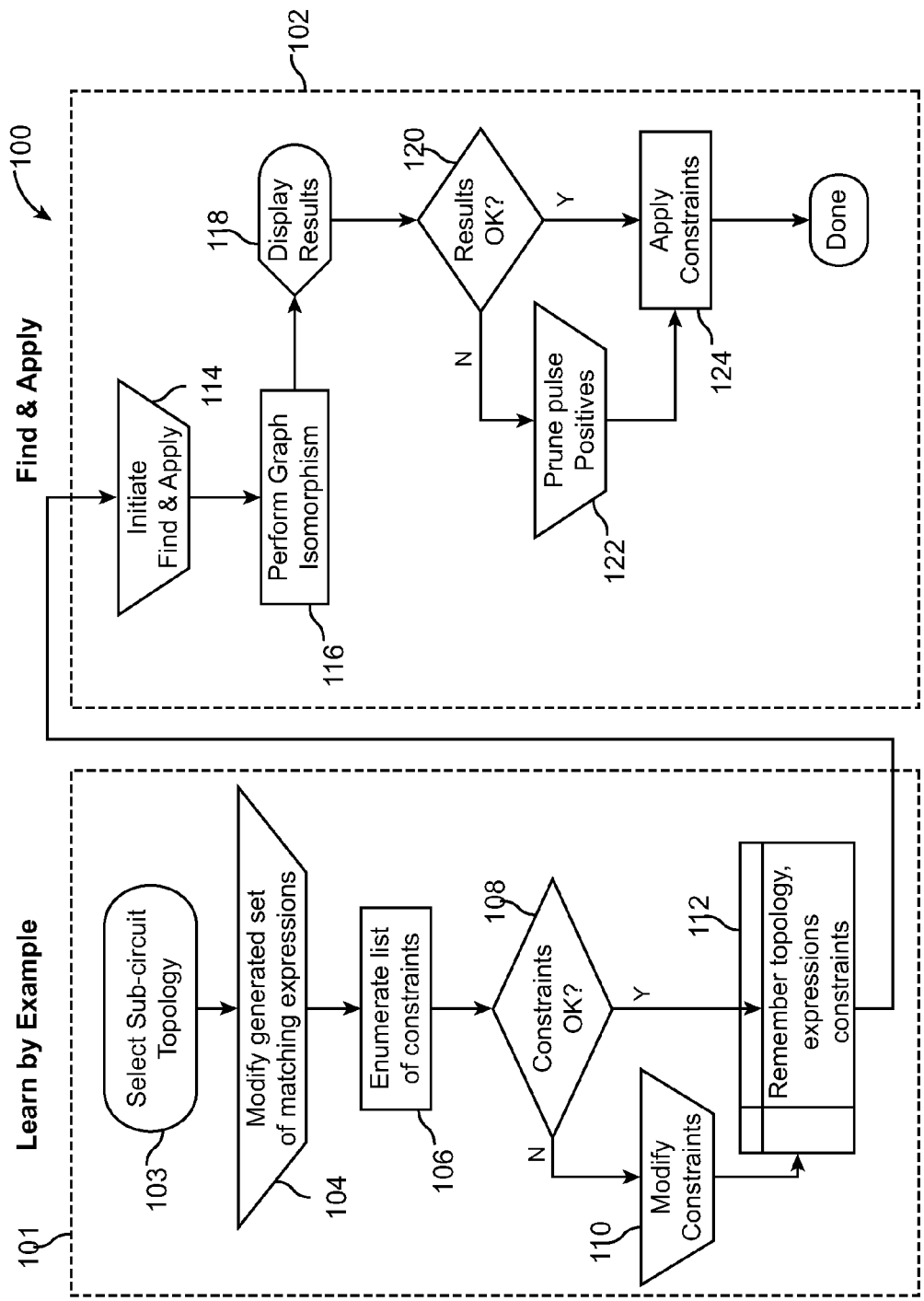
FIG. 1 shows an illustrative flow diagram of a computer implemented auto-interactive process to apply constraints to sub-circuits within a design in accordance with some embodiments of the invention.

The following description is presented to enable any person skilled in the art to make and use a computer implemented system and method of interactive application of constraints to sub-circuits in a circuit design stored in a computer readable medium in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Overview

A present embodiment of the invention provides a system and method by which circuit design software is 'taught' by a designer to recognize specific sub-circuit topologies and their associated constraints (if any), such that other occurrences of such topologies within a larger design context may be automatically identified independently of drawn circuit element positions, with the identified occurrences then constrained in a manner similar or identical to the teaching set, or any manner of the designer's choosing. Specifically, in some embodiments, a designer interactively creates an information structure comprising computer readable code encoded in a computer readable medium that includes specified topology information, matching expression information and constraint information. The system is configurable allowing a chosen training topology to be either generalized or made more specific via designer-customized sets of matching expressions. A set of constraints recommended by a designer are associated automatically with other found topology examples from an overall circuit design that match the specified topology. In order to expedite this process, the system generates initial seed sets of matching expressions which currently match the chosen training topology objects, and these seed expressions sets can be further modified, edited, extended or otherwise customized by the designer.

In brief, some embodiments of this invention provide a method to guide a user in creating a new information structure using a graphical entry mechanism while automatically extracting and storing information that already exists in an EDA circuit design tool such as the Virtuoso system, produced by Cadence Design Systems, Inc., having a place of business in San Jose, Calif. In some embodiments, this is achieved using a learn-by-example approach: a designer (1) selects a sub-circuit topology (the Training Topology) that will be used by a topology finder; (2) the constraint system enumerates all the constraints that already exist in the system and are associated with the selected topology; (3) the designer validates this information and the system saves all the relevant information used to find further topology matches and subsequently apply the necessary constraints; (4) a (possibly different) designer instructs the software to find other examples of the same topology in a larger design context; (5) that designer prunes the resulting list to remove any false positives; and (6) that designer then applies the approved constraints to each of the remaining list of topology matches.

As an example, assume the designer identifies a group of four transistors that have two symmetry constraints and two alignment constraints. The graphical interface will present both the sub-circuit topology/connectivity and its existing constraint set. Further, assume that the designer decides that both of the symmetry and one of the alignment constraints are to be saved and creates a new correspondingly configured topology finder and names it, 'Quad', for example.

The new 'Quad' topology finder then can be used with a graph isomorphism algorithm (such as the Virtuoso XL Cloning Algorithm, produced by Cadence Design Systems, Inc.) to find sub-circuit instances within a larger design context that match the connectivity of the original teaching topology. Search results are displayed within a computer generated user interface. A set of default constraints is created using the one-to-one correspondence between the original teaching sub-circuit topology and the matched or found examples of similar/identical topology, as the user prunes and selects the required set of matched Quad transistors, and then applies the default constraints to them. In some embodiments, an extension to the graph isomorphism algorithm allows for "repeatable" devices to be tagged, such that the pattern is grown by incrementally finding the repeatable devices until it can no longer be matched. This allows structures such as current mirrors with an arbitrary number of mirror branches to be matched.

Learn by Example and Find and Apply Process
Overview

FIG. 1 shows an illustrative flow diagram 100 of a computer implemented auto-interactive process to apply constraints to sub-circuits within a design in accordance with some embodiments of the invention. The flow diagram includes two stages. FIG. 1 shows a first 'learn by example' stage, indicated within dashed lines 101, during which a first designer recommends one or more constraints to be applied to a specified sub-circuit type. FIG. 1 shows a second 'find and apply' stage indicated within dashed lines 102, during which a second designer (who may be the same or a different from the first designer) decides whether or not to adopt the recommended constraint assignments for individual instances of the sub-circuit type within a design context. In the course of the first stage 101, an information structure is created automatically that captures the design intent recommendation of the first designer. In the course of the second stage 102, the created information structure provides information used to identify individual instances of the sub-circuit type within the actual design context.

More specifically, during the first stage 101 in step 103, a first designer selects an example sub-circuit from within a circuit design. The selected sub-circuit has a topology, which comprises the components of the selected sub-circuit and their interconnection. The selected sub-circuit also is associated with properties such as transistor cell names, transistor dimensions (width and length), signal type etc. In step 104, the first designer specifies match criteria based upon properties the first designer desires to be associated with a sub-circuit type. In some embodiments, an expression is generated automatically and is presented to the first designer, in the SKILL computer programming language for example, to portray properties of the selected sub-circuit. In those embodiments in which such an expression is automatically generated, a first designer can specify properties by modifying the expression to specify property-based match criteria. The match expression can be used to broaden or narrow the scope of the topology matching. The first designer, by selecting a sub-circuit in step 103, and by implication, selecting its associated topology, and by defining match criteria in step 104, specifies a sub-circuit type. In step 106, the first designer enumerates constraints presently associated with the sub-circuit type (if any such constraints already exist). In step 108, the first designer determines whether the presently associated constraints are acceptable. If the presently associated constraints are not acceptable to the first designer, then in step 110, the first designer modifies the constraints associated with the sub-circuit type.

In step 112, a computer program process encoded in computer readable media automatically creates an information structure stored in computer readable media that associates the selected sub-circuit topology, the search criteria and the constraints as approved in step 108 or as modified in step 110. A computer program code example of the stored information structure is shown in TABLE 1, for the case where the set of default constraints is empty.

TABLE 1

```
procedure(Current_Mirror_MOS_Iterator(cellView matchExpr)
  FilterMatchResults(  MatchPatts(cellView list(list(nil
      'name           "Current Mirror MOS"
      'type           "MOS Current Mirror"
      'description    ""
      'insts          list(
                        list(nil
                          'instName "MN5"
                          'instId 0
                          'expr "_Instance_->libName ==
\"gpdk446\" &&_Instance_->cellName == \"nmos3\""
                          'terms list(
                            list(nil 'name "S" 'expr
"GetDeviceTermName(device \"S\")" 'net "n4")
                            list(nil 'name "G" 'expr
"GetDeviceTermName(device \"G\")" 'net "n5")
                            list(nil 'name "D" 'expr
"GetDeviceTermName(device \"D\")" 'net "n5")
                          )
                        )
                        list(nil
                          'instName "MN2"
                          'instId 1
                          'expr "_Instance_->libName ==
\"gpdk446\" &&_Instance_->cellName == \"nmos3\""
                          'terms list(
                            list(nil 'name "S" 'expr
"GetDeviceTermName(device \"S\")" 'net "n4")
                            list(nil 'name "G" 'expr
"GetDeviceTermName(device \"G\")" 'net "n5")
                          )
                        )
                      )
      'repeatableInstances        nil
      'nets           list(
                        list(nil
                          'name   "n5"
                          'expr   "t"
                        )
                        list(nil
                          'name   "n4"
                          'expr   "t"
                        )
                      )
      'pins           list(
                      )
      'matchExpr      "t"
      'finder         "Current Mirror MOS"
      'constraints            list(
                      )
  )
))
  matchExpr)
)
```

In a present embodiment, the created information structure serves as an extension to the EDA tool whereby the software 'learns' the topology and match criteria used to locate sub-circuit instances in a larger design context. Step 112 follows step 108 if the first designer approves of the presently associated constraints. Step 112 follows step 110 if the first designer does not approve the presently constraints.

During the second stage 102 in step 114, a second user initiates a search for instances of the specified sub-circuit type within a circuit design context. In step 116, an automated search process uses the selected sub-circuit topology and the search criteria to identify instances of the sub-circuit in the circuit design context. In step 118, identified instances of the sub-circuit type and constraints recommended by the first designer are presented to the second designer for review. In step 120, the second designer evaluates whether or not to actually apply the recommended constraints to individual instances of the specified sub-circuit type. If the second designer does not agree with the application of the recommended constraints to one or more of the individual sub-circuit instances, then in step 122, the second designer prunes and/or modifies the constraints applied to be applied to one or more individual sub-circuit instances. In step 124, following step 120 for sub-circuit instances for which the second designer agrees with the constraint recommendation, and following step 122 for sub-circuit instances for which the second designer prunes and/or modifies the constraint associations, the second designer causes constraints to be applied to individual instances of the specified sub-circuit type.

The process is characterized as 'auto-interactive' because it involves both computer-automated steps and user/designer interactive steps. In particular, in some embodiments, the process involves a first circuit designer (i.e., a user who may actually comprise a group or panel of first designers) specifying a type of sub-circuit and proposing a constraint or set of constraints to be associated with the selected type of sub-circuit. In some embodiments, the first designer specifies the type of sub-circuit to which the constraint is proposed to be associated by selecting an example sub-circuit. The first designer further specifies the type of circuit by designating match criteria that further define the type of sub-circuit. The match criteria, for example, may specify one or more properties of sub-circuit type of the specified type. A computer-automated search process uses a graph of a topology of the sub-circuit selected by the first designer to identify in a design context, other sub-circuits that have the same topology as that of the sub-circuit selected by the first designer. The design context, for example, may be a design database representing circuit elements and their connectivity for a circuit design that is in development. A computer-automated matching process uses the match criteria specified by the first designer to determine which sub-circuits from among sub-circuits identified as having the same topology, match the sub-circuit type specified by the first designer. As such, the match criteria can broaden or narrow the range of matching sub-circuit instances. Later, a second circuit designer may decide upon application of the proposed constraint to one or more sub-circuits identified as having the same graph topology and determined as satisfying the match criteria. The second circuit designer decides upon the application of the constraint to such one or more sub-circuits within a design context.

Thus, during the learn by example stage 101, human interactivity is involved in making a general recommendation as to the applicability of a constraint to a specified type of sub-circuit. Later, during the find and apply stage, human interactivity is involved in making specific decisions as to whether to actually adopt the recommendation for individual sub-circuits identified within the actual design context. Following the learn by example stage 101, an automatic search processes identifies instances of the specified type of sub-circuit within a design context. The automatic search process, which does not rely upon human intervention, ensures that matching instances are not overlooked during evaluations in the find and apply stage 102.

Embodiments of the invention advantageously permit a first designer to in essence, make a recommendation to associate a constraint with a type of sub-circuit, and permit a second designer to automatically locate substantially all instances of the type of sub-circuit in a design context and decide whether or not to actually apply the proposed constraint to individual instances of the sub-circuit type located within the actual design context. Such a first designer, who may be a more experienced designer or group of designers, specifies a type of sub-circuit and proposes a constraint to be applied to the type of sub-circuit. An automated graph-based search process identifies substantially all instances of the sub-circuit type within an actual design context. Match criteria specified by the first designer may further specify sub-circuit type. A second designer, who may be a more junior designer, or a designer who is more familiar with details of a particular design context, or the same individual as the first designer who now is taking a closer look at his or her prior recommendation, can evaluate whether or not to actually apply the proposed constraint to specific instances of the sub-circuit type within an actual design context.

Hardware Environment

Figure 2:
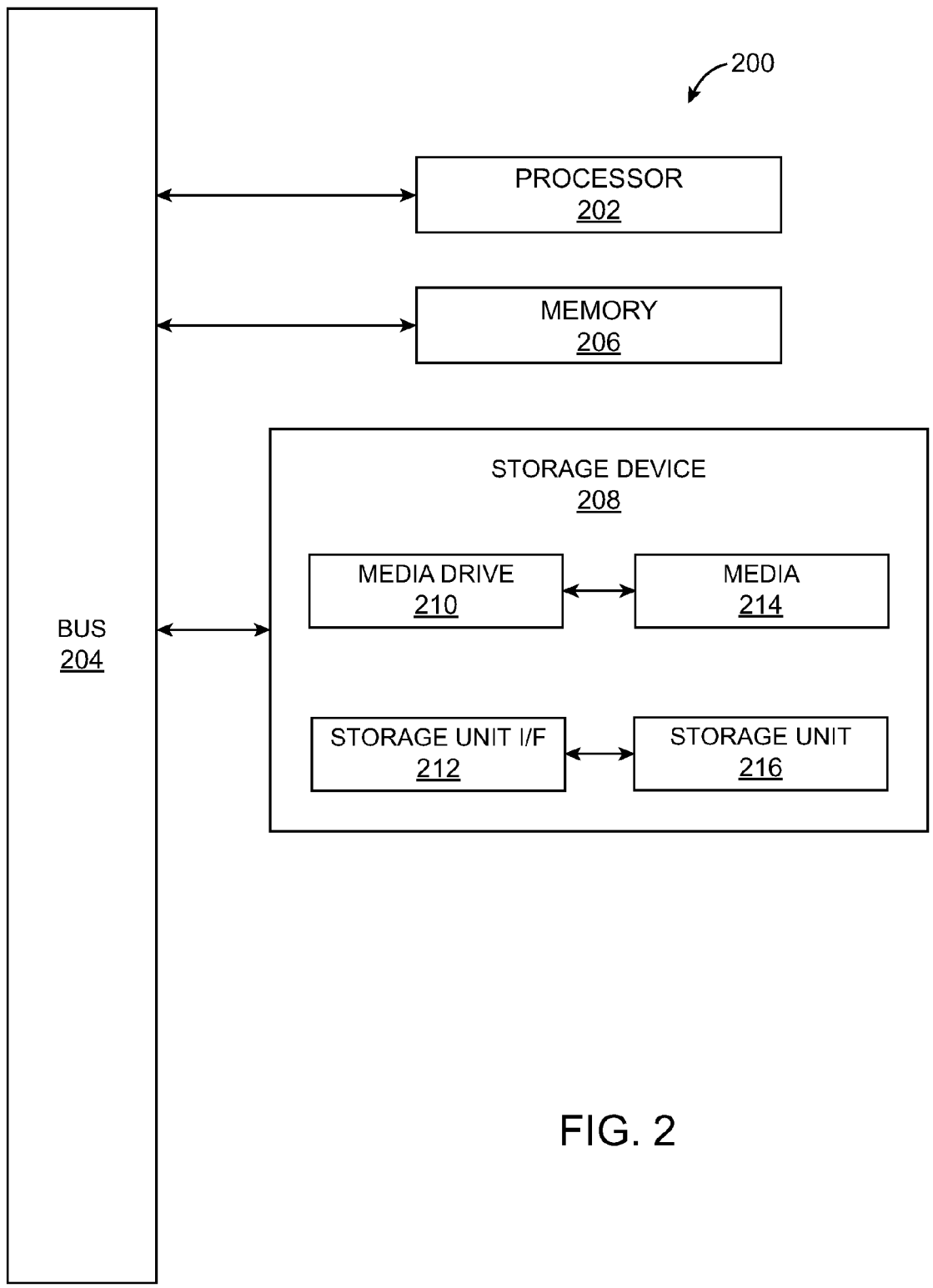
FIG. 2 is an illustrative block level diagram of a computer system that can be programmed to perform processes and to generate interactive user interfaces in accordance with embodiments of the invention.

FIG. 2 is an illustrative block level diagram of a computer system 200 that can be programmed to implement processes involved with the learn by example and find and apply flow and to generate interactive user interfaces in accordance with embodiments of the invention. Computer system 200 can include one or more processors, such as a processor 202. Processor 202 can be implemented using a general or special purpose processing engine such as, for example, a microprocessor, controller or other control logic. In the example illustrated in FIG. 2, processor 202 is connected to a bus 204 or other communication medium.

Computing system 200 also can include a main memory 206, preferably random access memory (RAM) or other dynamic memory, for storing information and instructions to be executed by processor 202. Main memory 206 also may be used for storing temporary variables or other intermediate information during execution of instructions to be executed by processor 202. Computer system 200 can likewise include a read only memory ("ROM") or other static storage device coupled to bus 204 for storing static information and instructions for processor 202.

The computer system 200 can also include information storage mechanism 208, which can include, for example, a media drive 210 and a removable storage interface 212. The media drive 210 can include a drive or other mechanism to support fixed or removable storage media 214. For example, a hard disk drive, a floppy disk drive, a magnetic tape drive, an optical disk drive, a CD or DVD drive (R or RW), or other removable or fixed media drive. Storage media 214, can include, for example, a hard disk, a floppy disk, magnetic tape, optical disk, a CD or DVD, or other fixed or removable medium that is read by and written to by media drive 210. Information storage mechanism 208 also may include a removable storage unit 216 in communication with interface 212. Examples of such removable storage unit 216 can include a program cartridge and cartridge interface, a removable memory (for example, a flash memory or other removable memory module). As these examples illustrate, the storage media 214 can include a computer useable storage medium having stored therein particular computer software or data.

In this document, the terms "computer program medium" and "computer useable medium" are used to generally refer to media such as, for example, memory 206, storage device 208, a hard disk installed in hard disk drive 210. These and other various forms of computer useable media may be involved in carrying one or more sequences of one or more instructions to processor 202 for execution. Such instructions, generally referred to as "computer program code" (which may be grouped in the form of computer programs or other groupings), when executed, enable the computing system 200 to perform features or functions of the present invention as discussed herein.

Graph Isomorphism

Figure 3A:
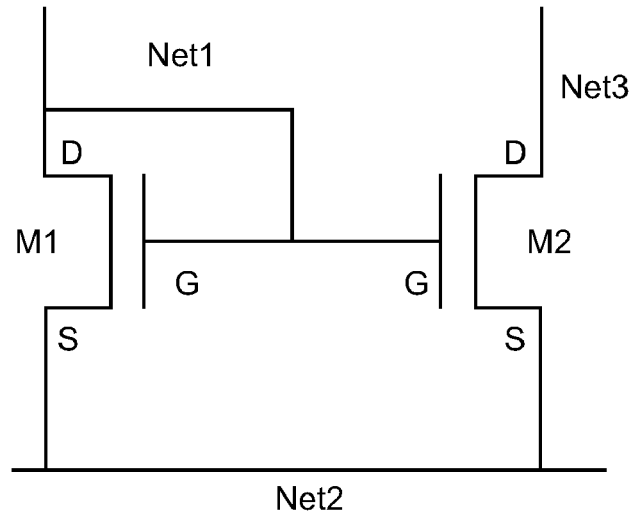
FIGS. 3A-3B are illustrative drawings of a schematic diagram of an example sub-circuit (FIG. 3A) and a graph representation of the sub-circuit (FIG. 3B).
Figure 3B:
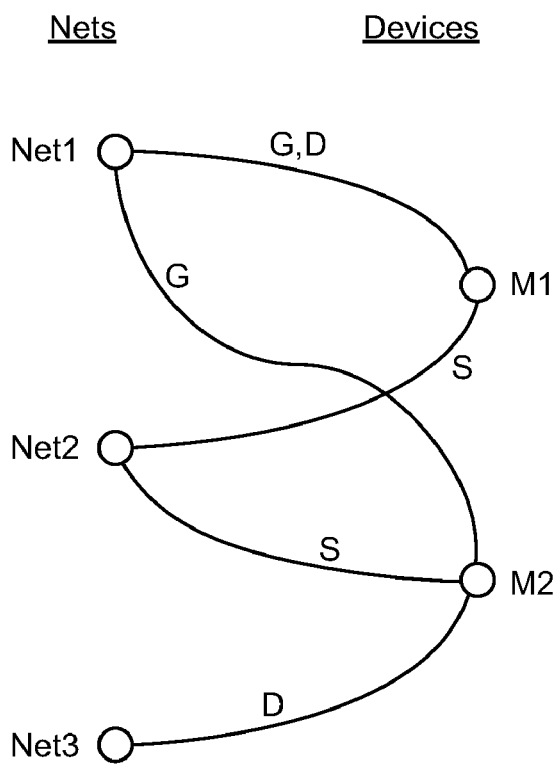

FIGS. 3A-3B are illustrative drawings of a schematic diagram of an example sub-circuit (FIG. 3A) and a graph representation of the sub-circuit (FIG. 3B). The example schematic diagram of FIG. 3A portrays a current mirror comprising two field effect transistor (FET) devices M1 and M2 having interconnected gates and having the drain of M1 connected to the interconnected gates. The drain of M1 is connected to Net3. The drain of M2 is connected to Net3. The sources of M1 and M2 are connected to Net2.

The example graph of FIG. 3B shows a bipartite circuit graph in which the left set of nodes represent Circuit Pins/Nets/Wires (or electrical nodes), and the right set represent the Device instances. The edges represent the connectivity to specific Device terminals (such as source, gate, drain for MOSFET instances), and are labeled accordingly.

In the course of the learn by example stage 101, a first designer may select the example sub-circuit of FIG. 3A as a training example. A circuit graph generation process automatically captures the topology of the selected sub-circuit and maps the topology to the example graph of FIG. 3B. Circuit graph generation processes are well known to persons of ordinary skill in the art. For example, the software iterates over all the instances in the current selection set, collecting those instances in a list (or other) data structure which represents the nodes on the right-hand-side (RHS) of the graph. Likewise, the software iterates over the nets in the current selection set, creating a list (or other) data structure comprising the unique net names, thus forming the nodes on the left-hand-side (LHS) of FIG. 3I. For each instance, the software determines which of the nets are connected to that instance by inspection of the instance terminal connections, and this information is stored in pointers representing the arcs in the graph of FIG. 38. For example, by inspection of FIG. 3A it can be easily determined that Net1 is connected to two transistors M1 and M2, and further that the connection to transistor M1 involves both the gate and drain (G,D respectively) terminals of that transitory. The connection to transistor M2 is to its gate (G) terminal only. The terminal information is added to the data structure pointers representing the net-to-instance and instance-to-net connectivity.

The user's selection of the example sub-circuit of FIG. 3A thereby identifies a training topology represented by the graph of FIG. 3B, which can be used as explained below, during the find and apply stage 102, to identify other sub-circuits having the same topology as the selected sub-circuit.

During the find and apply stage 102, a Graph Isomorphism algorithm is applied to search for and identity other instances/examples of the training topology. The isomorphism algorithm essentially finds other sub-graphs of the circuit that contain the same number of net nodes on the left hand side of the bipartite graph of FIG. 3B, the same number and types of Device Instance nodes on the right hand side of the bipartite graph of FIG. 3B, and with the same connectivity (edges of the graph), via the same device terminals. Both the device instances, and the circuit net/nodes have further properties (e.g. device width, cell name, and wire width, signal type) associated with them. After a sub-circuit instance having a matching topology has been identified, further checks are performed to ensure that individual match expressions (described below) are met. Some devices in the topology can be tagged as "repeatable" i.e. repeatable sub-graphs. For any devices/nets marked as "repeatable", sub-sub-graphs of those will be matched in a recursive/iterative manner, and the pattern grown until it can no longer be matched.

Match Expressions

Match expressions can be used to further specify a type of sub-circuit. In some embodiments, an initial (seed) set of match expressions are generated automatically using a computer software process encoded in computer readable memory that correspond to the devices (nets, and pins) in the selected training set. For example, for transistor devices, an initial matching expression is generated which compares the actual device name property against a particular name string such as "NMOS", and the actual device library property against a particular name string such as "gpdk090", where those strings are determined by inspecting the corresponding property names on the selected devices in the schematic. Such match expressions can be tailored/customized/extended by the first designer, via a rich expression language (SKILL in the case of a preferred embodiment). By doing so, the first designer can specify sub-circuit type either in more generic terms or in more specific terms as desired, leveraging the power of the expression language. In a preferred embodiment, the SKILL language provides access to a multitude of properties, attributes and parameters, from database parameters to library/file system parameters etc. Further, SKILL is a rich programming language in and of its own right, and so its full set of high level programming constructs (including ability to write complex sub-routines etc) also are at the disposal of the more advanced user or CAD group with which to tailor these expressions. More information detailing the SKILL language can be obtained from the following references: G. Wood and H-F S. Law, "SKILL—An Interactive Procedural Design Environment," Proceedings of Custom Integrated Circuits Conference, 1986, pp. 544-547; and Timothy J. Barnes, "SKILL: A CAD System Extension Language," Design Automation Conference, 1990, pp. 266-271

A simple SKILL language example of a match expression is as follows:

---

_Instance_->libName == "gpdk090" AND_Instance_->cellName == "nmos3"

---

An example of writing a more generic match expression is to write a SKILL expression such as IsDevice(_Instance_"FET")

where is Device( ) is a subroutine (accepting a Database instance pointer and device family name as arguments). The is Device ( ) subroutine can be written so as to match "FET" devices originating from any library at the users disposal, e.g. library==(libraryA or libraryB or libraryC or . . . or Library Z). Use of the OR operator or any such language equivalent allows generic matching expressions to be written.

An example of writing a more specific match expression might be to write an expression that matches a particular cell from a particular library only, such as, _Instance_->library=="gpdk090" and_Instance_->cell=="NMOS" and_Instance_->cellview=="three_volt", which is intended to match only 3V Nmos transistors from the gpdk090 library. Here the use of the AND operator (or any such language equivalent) allows very specific matching expressions to be written.

It will be appreciated that, in general, a topology of a given sub-circuit is circumscribed by its constituent components (e.g. device instances and their properties) and by the connectivity of those components. In accordance with one aspect of the invention, a match expression can be used to broaden the scope of topology matching by increasing the range of components considered to fall within at least one constituent of the topology. For instance, a transistor M25 may be a constituent of a topology corresponding to a selected (training example) sub-circuit. A modified topology may be defined that has been broadened by changing a definition of or limitation of components that are eligible to represent transistor M25 in the modified topology, for example, by making transistors from many different libraries eligible to serve the role of M25 for matching purposes. Conversely, a match expression can be used to narrow the scope of topology matching by reducing the range of components considered to fall within the modified topology. A modified topology may be defined that has been narrowed by changing a definition of or limitation of components that are eligible to represent transistor M25 in the modified topology, for example, by making fewer transistors from fewer different libraries eligible to serve the role of M25 for matching purposes. Therefore, match criteria can alter the topology definition corresponding to a given sub-circuit. Specifically, in accordance with embodiments of the present invention, a match expression is used to produce a modified topology corresponding to the training example sub-circuit selected by a designer. That modified topology serves as the sub-circuit type (i.e. topology finder) used with a graph-based search technique to locate matching sub-circuit instances in a larger design context.

Figure 4:
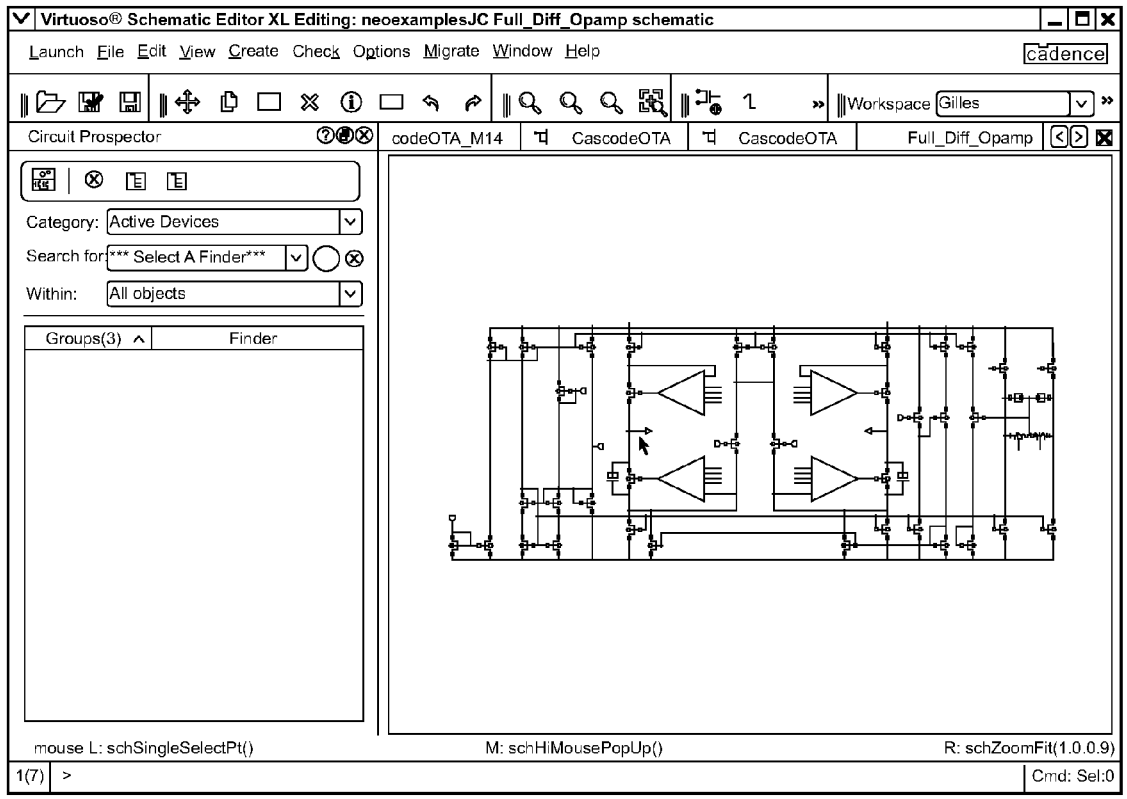
FIG. 4 is an illustrative drawing of a computer generated screen display including a "Circuit Prospector" user interface for use in learn by example and find and apply stages of the process of FIG. 1 in accordance with some embodiments of the invention and also including a user interface of a schematic capture design tool showing a schematic representation of an example circuit design.

Computer Generated User Interface System for Learn by Example and Find and Apply Stages FIG. 4 is an illustrative drawing of a computer generated screen display including a "Circuit Prospector" user interface for use in learn by example and find and apply stages of the process of FIG. 1 in accordance with some embodiments of the invention, and also including a user interface of a schematic editor design tool showing a schematic representation of an example circuit design. In a present embodiment the user interface is labeled "Circuit Prospector". The Circuit Prospector user interface permits first designers to recommend the association of a constraint group comprising zero or more constraints to sub-circuits types specified by the first user. In other words, the first designers may associate zero constraints with a sub-circuit type or some greater number of constraints with a sub-circuit type. The Circuit Prospector user interface also permits second designers to later individually accept, reject or modify the recommended constraints. In other words the second designers may selectively accept or reject individual constraints of a constraint group associated with a sub-circuit type. A schematic editor software tool implements the canvas on which a circuit representation in the form of a schematic is displayed. In one embodiment, the schematic editor software tool is the Cadence Virtuoso® Schematic Editor, produced by Cadence Design Systems, Inc., having a place of business in San Jose, Calif. Alternatively, for example, the circuit representation may be presented as a tabular listing of circuit elements and their connections, or as a text representation such as in the form of a SPICE netlist (or a Verilog-A netlist, or netlists of other languages). In other words, any graphical or textual circuit representation may be employed, which supports selection by a designer of at least some of the constituent components of a sub-circuit.

Figure 5:
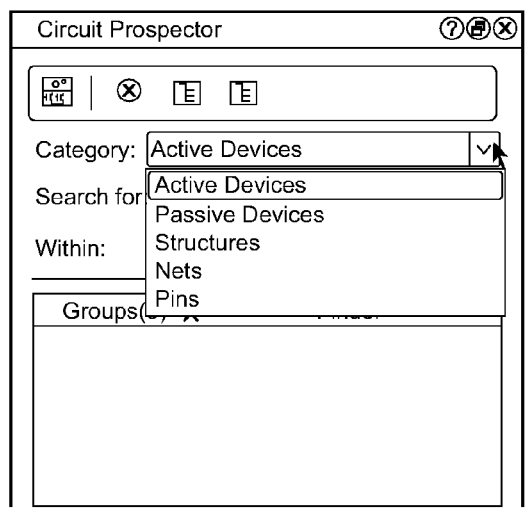
FIG. 5 is an illustrative drawing of a portion of the "Circuit Prospector" user interface of FIG. 4 illustrating a user selection of the "Category" pull-down menu and showing a list of categories of pre-installed 'topology finders' in accordance with some embodiments of the invention.

FIG. 5 is an illustrative drawing of a portion of the "Circuit Prospector" user interface of FIG. 4 illustrating a user selection of the "Category" pull-down menu and showing a list of categories of pre-installed 'topology finders' in accordance with some embodiments of the invention. The categories of topology finders in the illustrative pull-down menu are: 'Active Devices', 'Passive Devices', Structures' 'Nets', and 'Pins'. As used herein, the term 'topology finder' signifies an information structure encoded in computer readable medium that corresponds to a sub-circuit type and that is associated with a graph structure representing a topology of the corresponding sub-circuit type. The associated graph structure can be used by an Isomorphic Graph algorithm to locate instances of sub-circuits in a larger design context that have the same topology as that of the corresponding sub-circuit. As explained below, a first designer can further specify a type of sub-circuit by specifying match criteria associated with the topology finder, i.e. associated with the topology. Moreover, the first designer can recommend a constraint group to be associated with the specified sub-circuit type.

Figure 6:
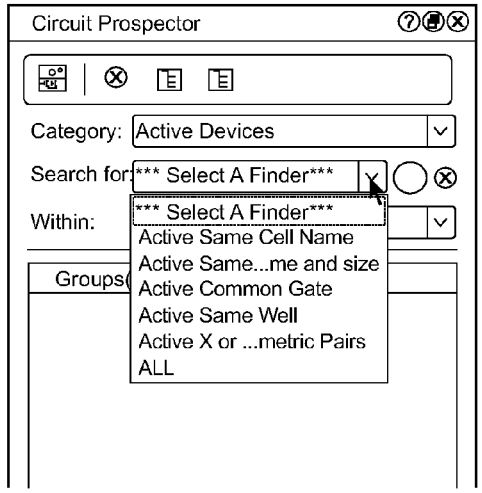
FIG. 6 is an illustrative drawing of a portion of the user interface of FIG. 4 illustrating a user selection of the "Search For/Select A Finder" pull-down menu within an Active Devices Category and showing a list of pre-installed 'topology finders' in accordance with some embodiments of the invention.

FIG. 6 is an illustrative drawing of a portion of the user interface of FIG. 4 illustrating a user selection of the "Search For/Select A Finder" pull-down menu within an Active Devices Category and showing a list of pre-installed topology finders in accordance with some embodiments of the invention. The topology finders named in the illustrative pull-down menu are: Active Same Cell Name, Active Same Cell Name and Size, Active Common Gate, Active Same Well, etc. The first listed topology finder in the menu can be used during the find and apply stage 102 to locate sub-circuits that have the same cell name. The second listed topology finder in the menu can be used during a find and apply stage 102 to locate active devices that have the same cell name and that also have the same transistor size (gate width and length) It will be appreciated that in the topology finders illustrated example of FIG. 6, are for use in finding single devices, e.g. transistors, diodes, etc. However, other categories of topology finders may include structure finders, which are designed to find more complex (i.e., multi-device, multi-net-connectivity) structures, such as differential pairs, current mirrors, etc.

Figure 7:
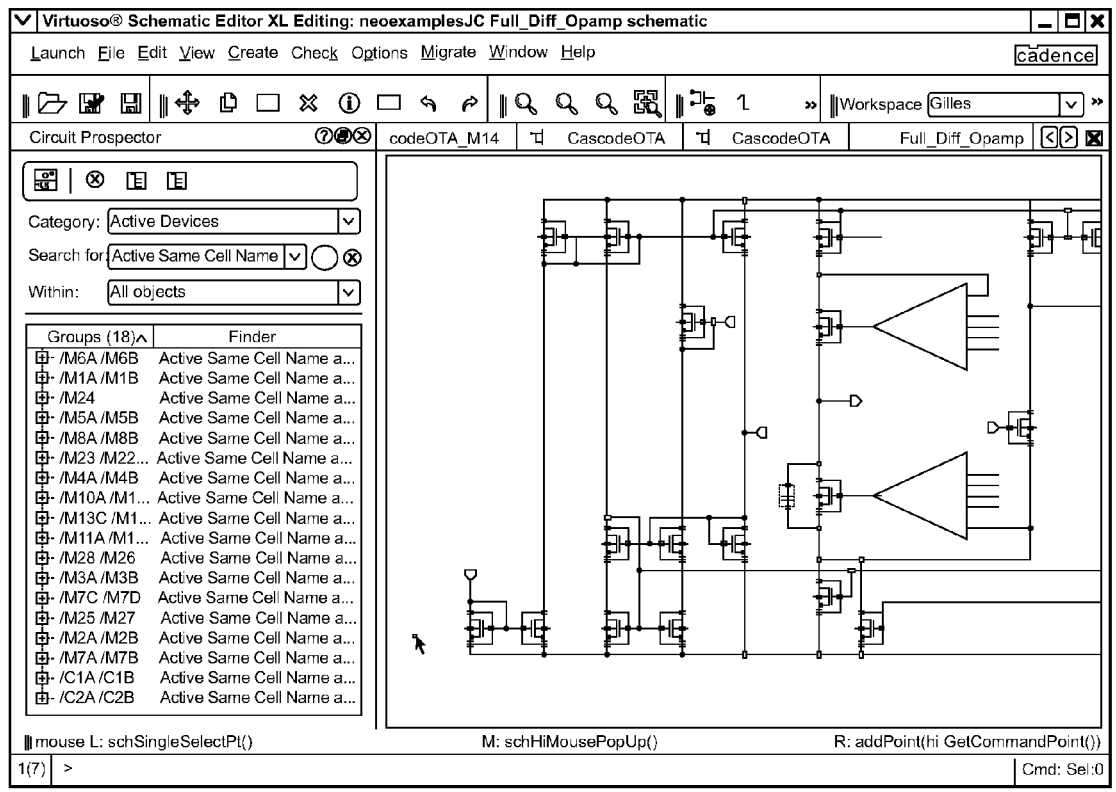
FIG. 7 is an illustrative drawing of a computer generated screen display including the user interface of FIG. 4 and a canvas showing a schematic view of a circuit design in which the user interface lists a selection of found matching sub-circuits presented in response to a user's selection of the "Active Same Cell Name" item from the pull-down menu of the user interface of FIG. 6.

FIG. 7 is an illustrative drawing of a computer generated user interface including the user interface of FIG. 4 and a user interactive canvas showing a schematic view of a circuit design in which the user interface lists a selection of found sub-circuits presented in response to a user's selection of the "Active Same Cell Name" item from the pull-down menu of the user interface of FIG. 6. In some embodiments, the schematic circuit diagram produced on the canvas highlights each different found sub-circuit in a different color, e.g., green orange magenta, etc. The use of color makes it easy for the designer to visually distinguish one found sub-circuit from another, as all constituent devices for a sub-circuit are highlighted in the color which is assigned to that sub-circuit, and which is different from one found sub-circuit to the next. In some embodiments, the designer can selectively click on one or more of the found topology names listed on the left so as to cause only its constituent devices to be highlighted in the schematic diagram on the right. In this manner, the designer can learn by inspection the association between the textual names on the left, and the corresponding devices in the schematic on the right.

Figure 8:
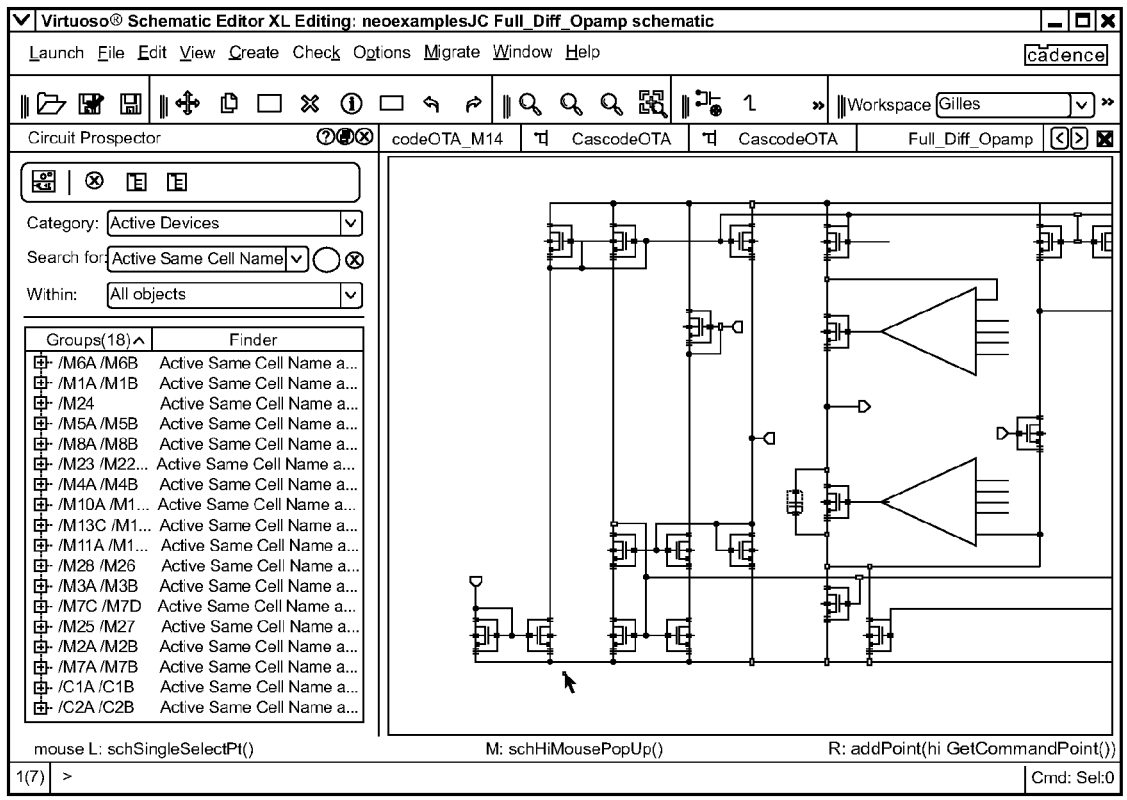
FIG. 8 is an illustrative drawing of the computer generated screen display of FIG. 7 in which a designer is in the midst of selecting a sub-circuit within the schematic circuit design display in order to specify an example sub-circuit of a sub-circuit type in accordance with some embodiments of the invention.

FIG. 8 is an illustrative drawing of the computer generated interactive screen display of FIG. 7 in which a first designer is in the midst of selecting a (teaching topology) sub-circuit within the schematic circuit design display (see mouse arrow) in order to specify an example sub-circuit of a sub-circuit type in accordance with some embodiments of the invention.

Figures 9, 10:
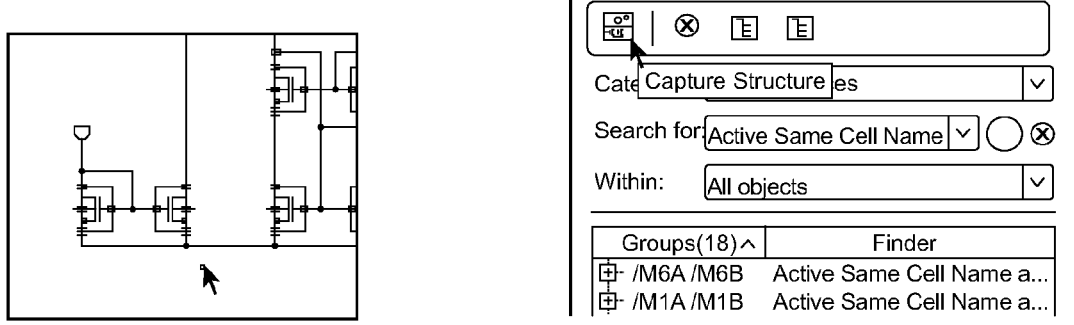
FIG. 9 is an illustrative enlarged drawing of a portion of the lower left canvas of FIG. 8 showing the sub-circuit example being selected by the designer.
FIG. 10 is an illustrative drawing showing a user about to actuate a "Capture Structure" toolbar button so as to initiate receipt of user input to create a new topology finder information structure corresponding to the example sub-circuit selected in FIGS. 8-9 in accordance with some embodiments of the invention.

FIG. 9 is an illustrative enlarged drawing of a portion of the lower left canvas of FIG. 8 showing the (teaching topology) sub-circuit example being selected (see mouse arrow) by the first designer. The interactive screen display receives a designer indication of the sub-circuit to be selected through a selection mechanism available with the design canvas, such as a rubber band or bounding box selection rectangle. In this example, the selected sub-circuit is a current mirror circuit, which comprises two transistors with a common source and gate connection as shown in FIG. 9. Though not shown in the drawings of FIGS. 8-9, in some embodiments, the user can also tag specific devices (such as the rightmost selected transistor in the current mirror) as "repeatable", such that (in this particular example) this teaching structure (i.e. the selected current mirror circuit) also can be used to find multi-legged current mirrors of an arbitrary number of legs.

FIG. 10 is an illustrative drawing showing a user about to actuate a "Capture Structure" toolbar button so as to initiate receipt of user input to create a new topology finder information structure corresponding to the example sub-circuit selected in FIGS. 8-9 in accordance with some embodiments of the invention. The user interface screen portion in FIG. 10 shows a user about to actuate a "Capture Structure" toolbar button so as to initiate capture of a sub-circuit structure to be identified by the designer in a circuit design. In particular, the "Capture Structure" button is used to capture information concerning the example sub-circuit selected as described in FIGS. 8-9.

Figure 11:
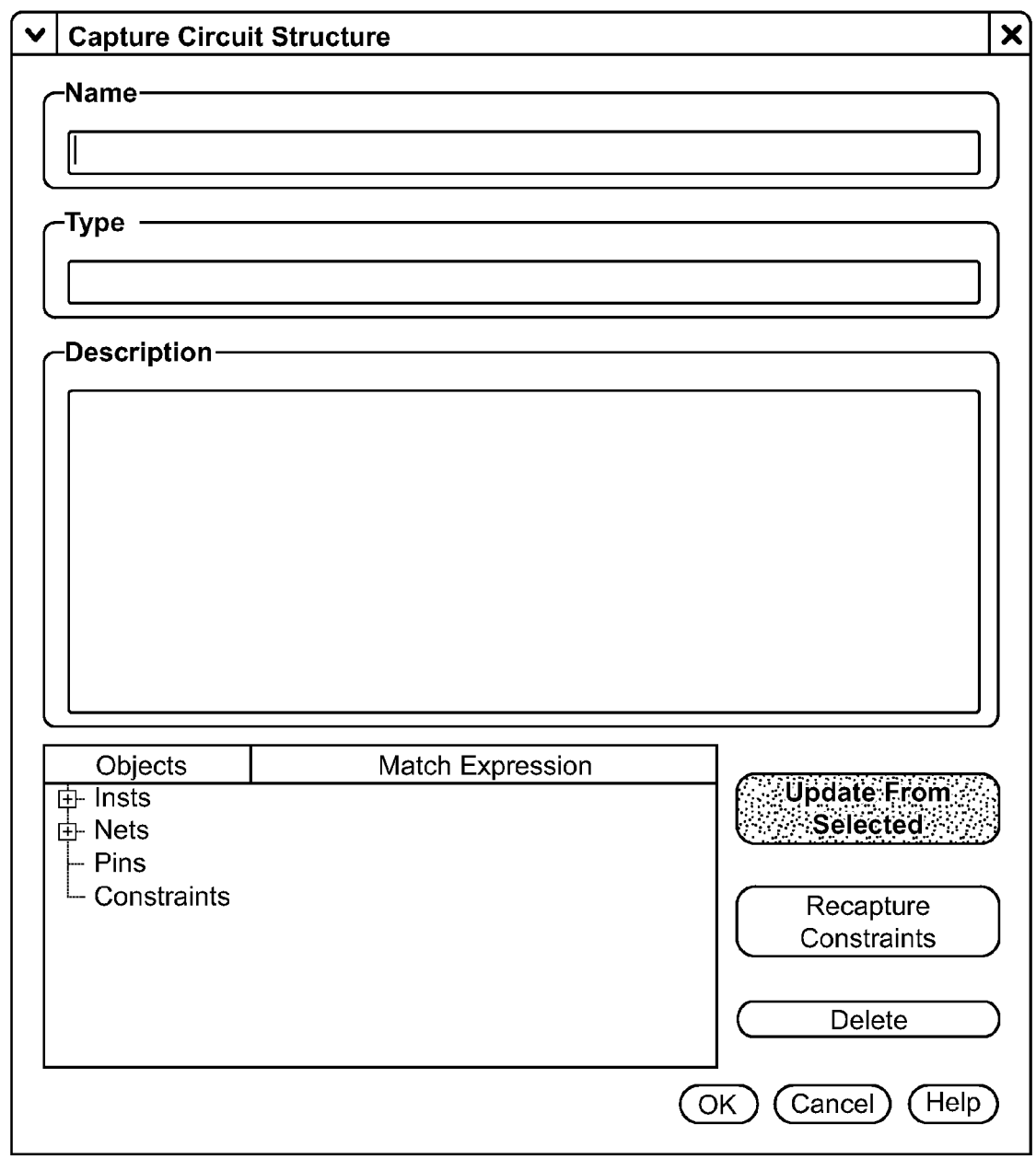
FIG. 11 is an illustrative drawing of a "Capture Circuit Structure" user interface form, which is mostly blank, i.e. not completed, in accordance with some embodiments of the invention.

FIG. 11 is an illustrative drawing of a "Capture Circuit Structure" user interface form, which is mostly blank, i.e. not completed, in accordance with some embodiments of the invention. The form is used to receive user input to specify sub-circuit type and associated constraints. As explained above, a constraint group comprising zero or more constraints may be associated with a sub-circuit type. The input received into the form is used in the creation of a topology finder information structure used during the find and apply stage 102 to locate instances of the specified type in a larger circuit design context. Although the form in FIG. 11 is mostly blank, there is shown an index structure, which includes entries for Instances, Nets, Pins and Constraints, which can be used to receive and display, match expression information and sub-circuit topology information.

Figure 12:
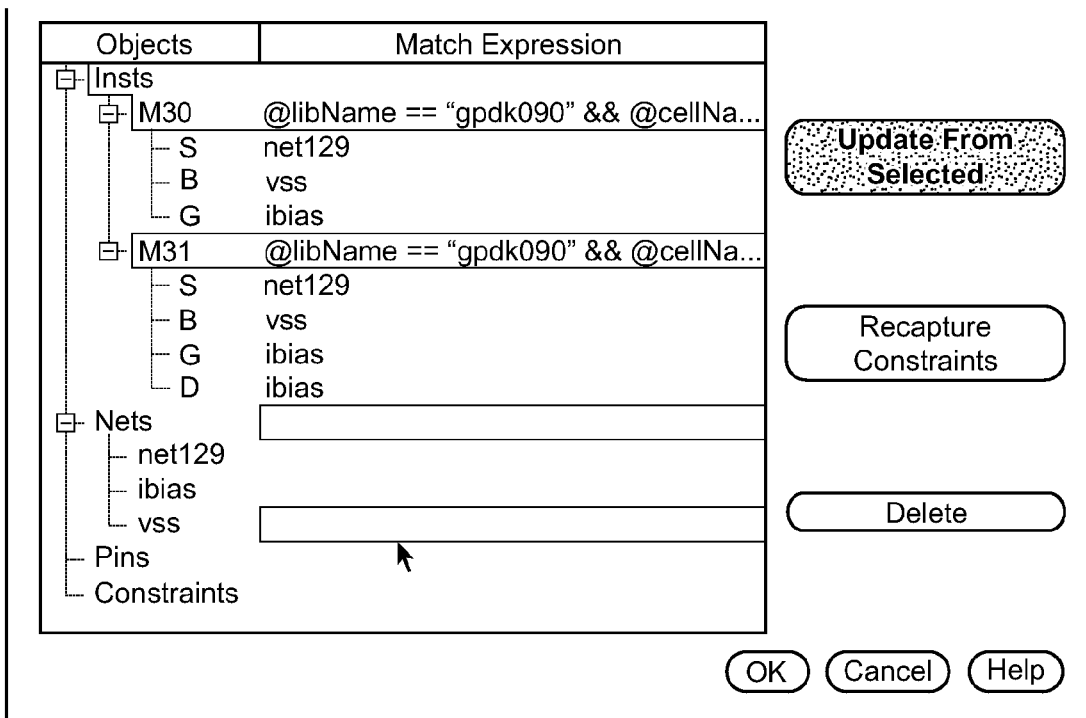
FIG. 12 is an illustrative drawing of a bottom portion of the "Capture Circuit Structure" user interface form of FIG. 11 as it appears in response to a user actuating the "Capture Structure" toolbar button of FIG. 10 in the course of a user's sub-circuit type selection of FIGS. 8-9 in accordance with some embodiments of the invention.

FIG. 12 is an illustrative drawing of a bottom portion of the "Capture Circuit Structure" user interface form of FIG. 11 as it appears in response to a user actuating the "Capture Structure" toolbar button of FIG. 10 in the course of a user's sub-circuit type selection of FIGS. 8-9 in accordance with some embodiments of the invention. The form now includes captured topology information pertaining to the selected sub-circuit in the lower part of the form, as a list of Device Instances (Insts), Nets, Pins, and existing Constraints. This topology and set of constraints corresponds to the present selection set in the schematic canvas, (and can be updated to a different selection set by selecting and pressing the "Update From Selected" button in the figure). Constraints associated with the selected topology are also captured for later processing.

Also shown in FIG. 12, the user interface form includes expressions corresponding to the M30 and M31 transistor devices. In this example, these are default match expressions that are presented automatically in some embodiments upon capture of the selected sub-circuit. The expressions indicate the name of the library and the cell name for each of M30 and M31. These expressions can be edited by a designer using the SKILL programming language, a richly featured language that permits creation of expressions of arbitrary complexity, to further specify sub-circuit type. As explained above, a designer can specify match expressions to broaden or to narrow the range of sub-circuits that match a specified sub-circuit type. For instance, a designer might edit the expression to change the library name or to change the cell name, or to specify several alternative libraries or cell names, or to add additional information such as gate length or gate width. The expressions, as edited serve as match expressions in the identification of sub-circuits matching such specified sub-circuit type.

In addition, the user interface form portion in FIG. 12 also includes an expanded index structures for each of transistors M30 and M31 showing the connectivity for source (S), bulk (B), gate (G) and drain (D). The form also shows an expanded index structure for the Nets indicating that the selected sub-circuit includes nets for net129, ibias and vss. The index structures for Pins and Constraints are not expanded in this example form.

Thus, through this simple and highly intuitive selection mechanism, the user selects a desired training topology with which to 'teach' the software i.e. to specify a sub-circuit type and recommended constraints. An automated software process uses the information captured in the form to create an information structure that contains topology, match criteria and recommended constraints. An illustrative computer program code example of the information structure for a "Current Mirror MOS 2" finder, captured along with recommended "matchedParameters" constraints is shown in TABLE 2, as follows:

TABLE 2

```
procedure(Current_Mirror_MOS_2_Iterator(cellView matchExpr)
    FilterMatchResults(    MatchPatts(cellView list(list(nil
        'name              "Current Mirror MOS 2"
        'type              "MOS Current Mirror"
        'description       ""
        'insts             list(
                           list(nil
                           'instName "MN5"
                           'instId 0
                           'expr "_Instance_->libName ==
\"gpdk446\" &&_Instance_->cellName == \"nmos3\""
                           'terms list(
                           list(nil 'name "S" 'expr
"GetDeviceTermName(device \"S\")" 'net "n4")
                           list(nil 'name "G" 'expr
"GetDeviceTermName(device \"G\")" 'net "n5")
                           list(nil 'name "D" 'expr
"GetDeviceTermName(device \"D\")" 'net "n5")
                           )
                           )
                           list(nil
                           'instName "MN2"
                           'instId 1
                           'expr "_Instance_->libName ==
\"gpdk446\" &&_Instance_->cellName == \"nmos3\""
                           'terms list(
                           list(nil 'name "S" 'expr
```

TABLE 2-continued

```
"GetDeviceTermName(device \"S\")" 'net "n4")
                           list(nil 'name "G" 'expr
"GetDeviceTermName(device \"G\")" 'net "n5")
                           )
                           )
                           )
        'repeatableInstances nil
        'nets              list(
                           list(nil
                           'name "n5"
                           'expr "t"
                           )
                           list(nil
                           'name "n4"
                           'expr "t"
                           )
                           )
        'pins              list(
                           )
        'matchExpr         "t"
        'finder            "Current Mirror MOS 2"
        'constraints       list(
                           list(nil
                           'name    "conName"
                           'type    "matchedParameters"
                           'params list( list("matchSubset" "l,w") )
                           'members list(
                           list(nil
                                    'name "MN5"
                                    'type "inst"
                                    'index 0
                           )
                           list(nil
                                    'name "MN2"
                                    'type "inst"
                                    'index 1
                           )
                           )
                           )
                           )
        )
    ))
    matchExpr)
)
```

A second computer program code example "Current Mirror Mos 3" is set forth in TABLE 3, in which the is Device( ) subroutine is used to create a more generic finder for current mirrors comprised of "FET" devices, along with repeatable instances for instId1, the first instance: Further, that first instance must be repeated with same Gate/Source terminal connectivity (though Drain terminal connectivity is obviously allowed to differ). Finally, an overall matching expression is included which enforces that none of the instances in the pattern have their drain and source terminals shorted (connected together).

TABLE 3

```
procedure(Current_Mirror_MOS_3_Iterator(cellView matchExpr)
    FilterMatchResults(    MatchPatts(cellView list(list(nil
        'name              "Current Mirror MOS 3"
        'type              "MOS Current Mirror"
        'description       ""
        'insts             list(
                           list(nil
                           'instName "MN5"
                           'instId 0
                           'expr "IsDevice(_Instance_\"fet\")"
                           'terms list(
                           list(nil 'name "S" 'expr
"GetDeviceTermName(_Instance_\"source\")" 'net "n4")
                           list(nil 'name "G" 'expr
```

TABLE 3-continued

```
"GetDeviceTermName(__Instance__\"gate\")" 'net "n5")
                        list(nil 'name "D" 'expr
"GetDeviceTermName(__Instance__\"drain\")" 'net "n5")
                        )
                        )
                        ;; instId 1 has to repeat N times with
same connectivity for gate/source and different for drain...
                        list(nil
                            'instName "MN2"
                            'InstId 1
                            'expr "IsDevice(__Instance__\"fet\")"
                            'terms list(
                                list(nil 'name "S" expr
"GetDeviceTermName(__Instance__ \"source\")" 'net "n4")
                                list(nil 'name "G" 'expr
"GetDeviceTermName(__Instance__ \"gate\")" 'net "n5")
                            )
                            'repeatable t
                        )
                    )
    'nets           list(
                        list(nil
                            'name "n5"
                            'expr "t"
                        )
                        list(nil
                            'name "n4"
                            'expr "t"
                        )
                    )
    'pins           list(
                    )
                    ;;; Make sure none of the insts in the pattern have
their drain and source terminals connected together
                    'matchExpr "zerop(length(setof(inst insts
NetOnTerm(inst GetDeviceTermName(inst \"drain\")) == NetOnTerm(inst
GetDeviceTermName(inst \"source\"))))"
    'finder             "Current Mirror MOS 3"
    'constraints        list(
                            list(nil
                                'name    "conName"
                                'type    "matchedParamaters"
                                'params list( list("matchSubset" "l,W"))
                                'members list(
                                    list(nil
                                        'name "MN5"
                                        'type "inst"
                                        'index 0
nil
                                    )
                                    list(nil
                                        'name "MN2"
                                        'type "inst"
                                        'index 1
nil
                                    )
                                )
                            )
                        )
                    )
))
    matchExpr)
)
```

Figure 13:
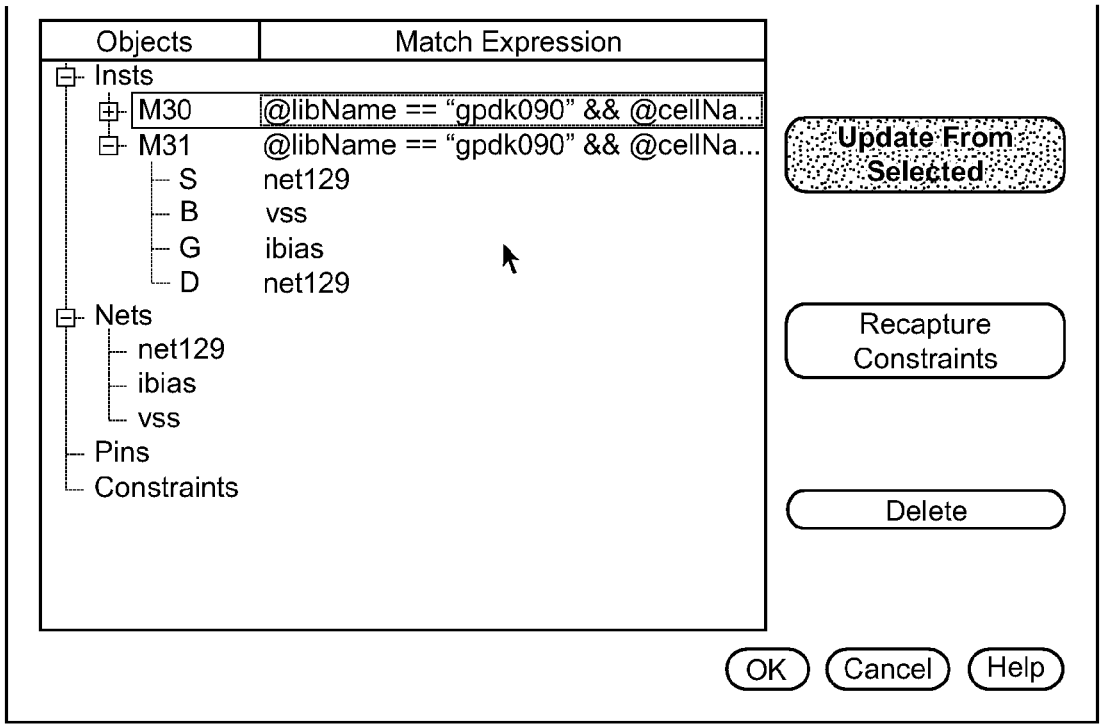
FIG. 13 is an illustrative drawing of the bottom portion of the "Capture Circuit Structure" user interface form of FIG. 12 in which a user/designer has selected (see dashed bounding box) the expression associated with device instance M30 for editing, in accordance with some embodiments of the invention.

FIG. 13 is an illustrative drawing of the bottom portion of the "Capture Circuit Structure" user interface form shown in FIG. 12 in which a user/designer has selected (see dashed bounding box) the expression associated with device instance M30 for editing, in accordance with some embodiments of the invention. This pre-generated (default) expression matches the selected sub-circuit shown to be selected in FIGS. 8-9 and potentially matches other similar devices in the circuit design also. The user in this example has selected this pre-generated expression so that he or she can edit it, adding or removing detail as desired.

Figure 14:
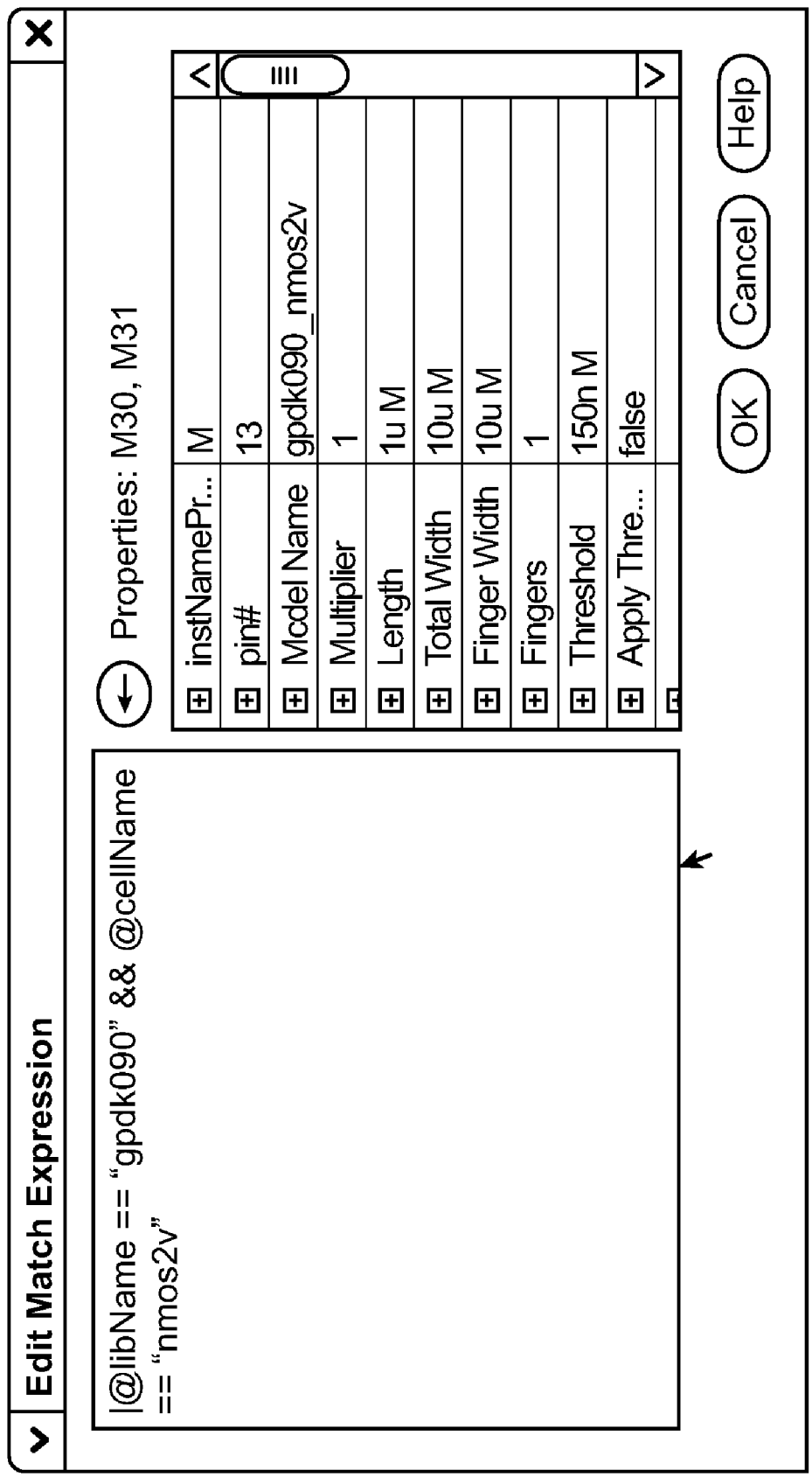
FIG. 14 is an illustrative drawing of an "Edit Match Expression" user interface display used to receive user input to edit the match expression selected by the user in FIG. 13 corresponding to the device instance M30 of the sub-circuit captured in FIG. 12, in accordance with some embodiments of the invention.

FIG. 14 is an illustrative drawing of an "Edit Match Expression" user interface display of a form used to receive user input to edit the match expression selected by the user as shown in FIG. 13 corresponding to the device instance M30 of the sub-circuit captured in FIG. 12, in accordance with some embodiments of the invention. The Edit Match Expression form can receive designer input to edit the example expression in the top left of the form. Specifically, the user/designer can input and the from can receive edits to the expression using appropriate programming constructs form the SKILL programming language, for example, to add or remove detail as desired. In this example, the matching expression indicates that the device must originate from the library named "gpdk090", and the corresponding device cell name must be "nmos2v". For instance, the form can receive user input to add more logical expressions to this to widen or narrow the match criteria as he or she deems necessary. For example, he or she could require that this finder match only devices from the "gpdk090" library, but whose cell names are "nmos1v" instead of "nmos2v", or whose cell name is either of "nmos1v" or "nmos2v" etc. The illustrative "Edit Match Expression" display also includes a property table for the selected device (M30) that lists candidate properties that can be added to the match expressions. The user may choose to include any combination of such properties to specify a matching expression to make the new topology finder information structure as simple or as complex as desired. As explained above, it is the topology finder information structure that specifies the sub-circuit type to which recommended constraints are to be associated.

Figure 15:
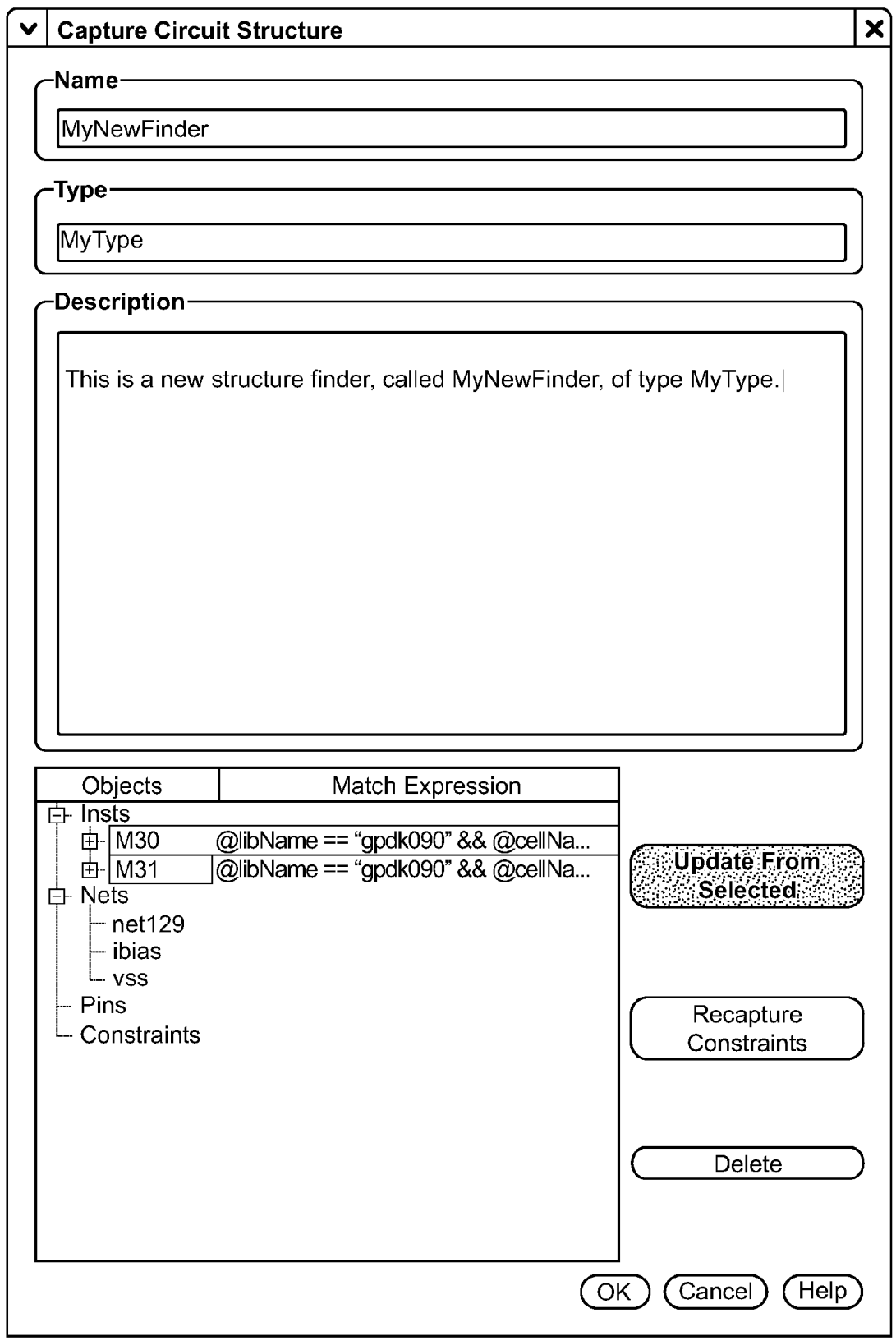
FIG. 15 is an illustrative drawing of the "Capture Circuit Structure" user interface form of FIG. 11 with topology information and expressions for the sub-circuit selected in FIGS. 8-9 (as possibly modified by the designer) in accordance with some embodiments of the invention.

FIG. 15 is an illustrative drawing of the "Capture Circuit Structure" user interface form of FIG. 11 with topology information and expressions for the sub-circuit selected in FIGS. 8-9 (as possibly modified by the designer) in accordance with some embodiments of the invention. The user chooses a Name, indicates a Type and enters a Description. The "type" field used in this form is used organizationally to determine which category the new finder fits under. Categories are shown in FIG. 5. Once the user approves this "Capture Circuit Structure" form, this Training Topology is captured, and the associated topology finder named as MyNewFinder, which will then appear in the "Circuit Prospector" user interface. Note that in this particular example, the selected current mirror does not currently have any Pins or Constraints associated with it i.e. the Pins and Constraints fields at the bottom of the form are empty. The name MyNewFinder appears on the user interface screen, therefore serves as a user readable representation of the topology finder and its (modified) topology.

Thus, it will be appreciated that during a portion of the learn by example stage 101 process illustrated with reference to FIGS. 4-15, a first designer creates a new topology. Specifically, a series of computer generated user interface screens are used to receive user input as to selection of a teaching example sub-circuit structure (FIGS. 8-10). The user interface screens show a topology of the selected structure, which is identified automatically (FIG. 12). The user interface screens also are used to receive user input as to a match expression (FIGS. 13-14). The resulting topology finder (FIG. 15) corresponds to an information structure encoded in computer readable medium that provides topology and match expression information that can be used during further steps in the learn by example stage 101 and during a subsequent find and apply stage 102.

Figure 16:
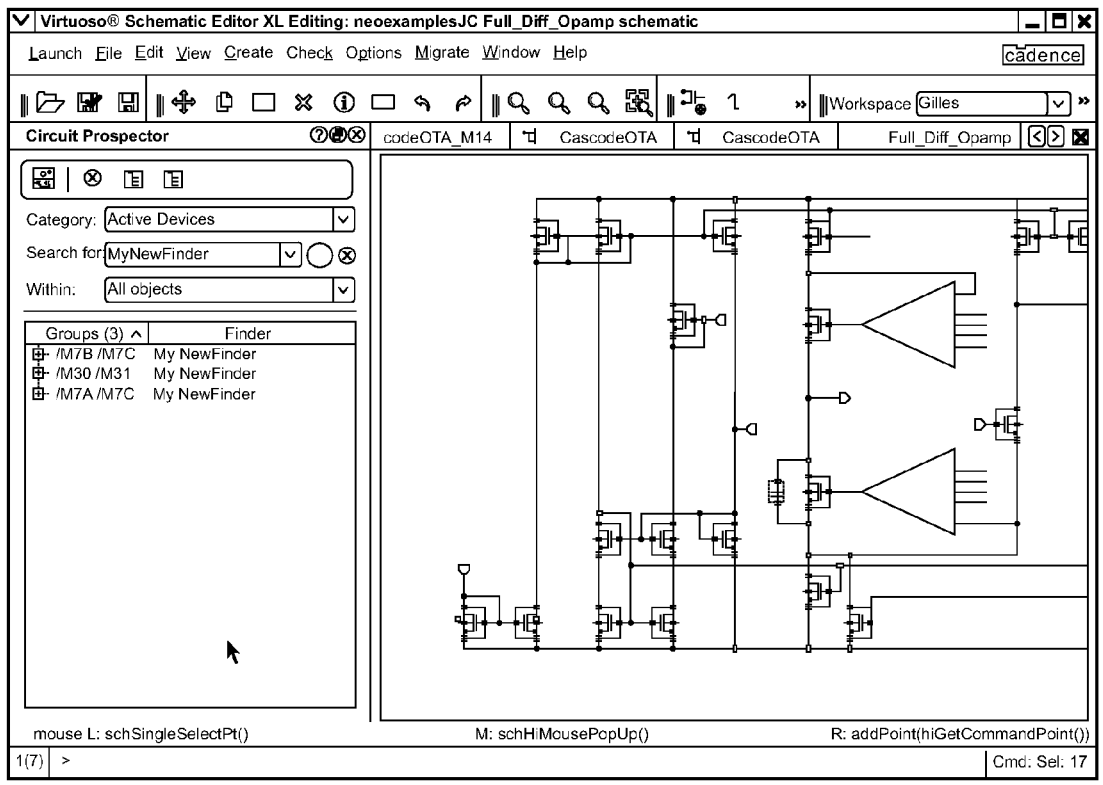
FIG. 16 is an illustrative drawing showing "Circuit Prospector" user interface and schematic capture tool user interface of FIG. 4 but with the addition of the MyNewFinder topology finder in accordance with some embodiments of the invention.

FIG. 16 is an illustrative drawing showing "Circuit Prospector" user interface and schematic capture tool user interface of FIG. 4 but with the addition of the MyNewFinder topology finder in accordance with some embodiments of the invention. In a bottom portion of the "Circuit Prospector" user interface, three sub-circuit instances of the current mirror sub-circuit type specified by the first designer in FIGS. 4-15 are listed as having been identified from within the overall circuit design shown by the schematic editor user interface to the right. These three sub-circuit instances are identified based upon the topology information shown in FIG. 15 using Isometric Graph algorithm in combination with the match expressions shown in FIG. 15.

Also, during another portion of the learn by example stage 101, the user may edit the list, and remove any false positives. He or she may do this by first inspecting each result (cross referencing the results against the circuit schematic) as shown in FIGS. 17-22, discussed below, and deleting any result deemed inappropriate. As an alternative to selecting each individual result as shown in FIGS. 17-22, the user may instead choose to select all the results at once via an extended selection paradigm, and see all cross selected transistors at once (figure not shown). This alternative approach is useful for quickly identifying and inspecting small numbers of matching sets. Non-desirable matches can be filtered by deleting them from the list using an appropriately supplied "delete" button or menu item.

Figure 17:
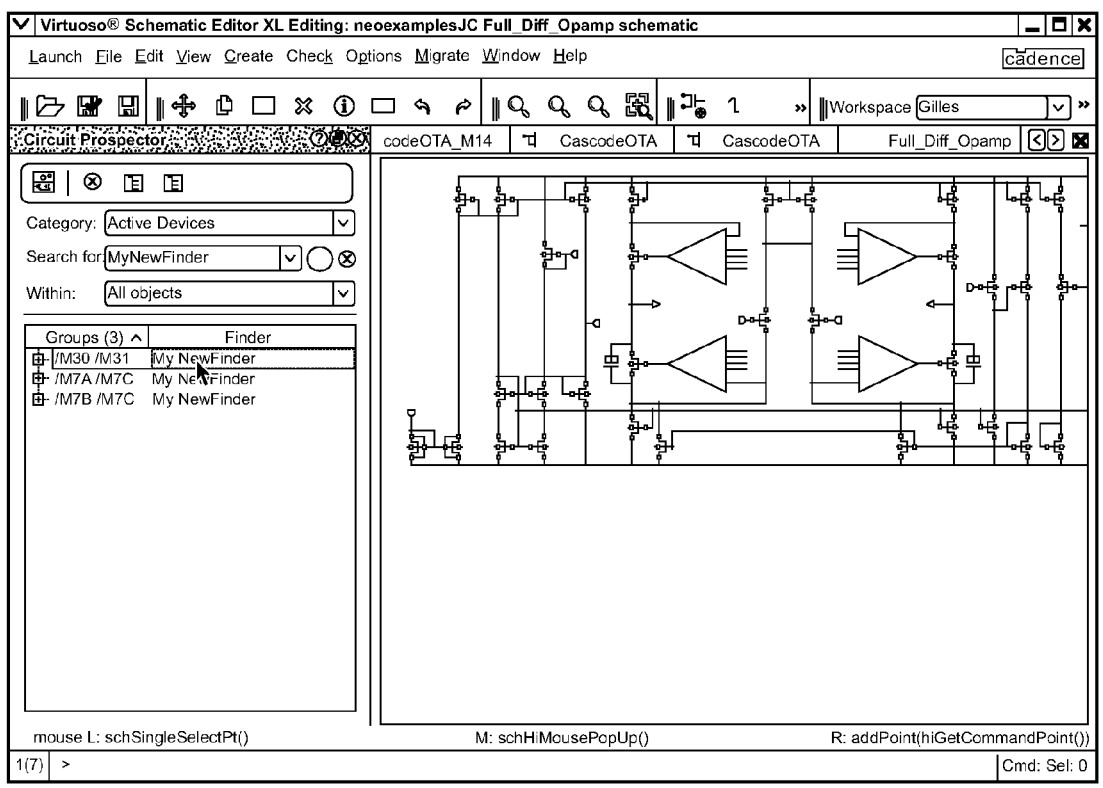
FIG. 17 is an illustrative drawing of the user interface of FIG. 16 showing the "Circuit Prospector" user selecting a first listed sub-circuit instance, (which matches the training set/sub-circuit type) in accordance with some embodiments of the invention.
Figure 18:
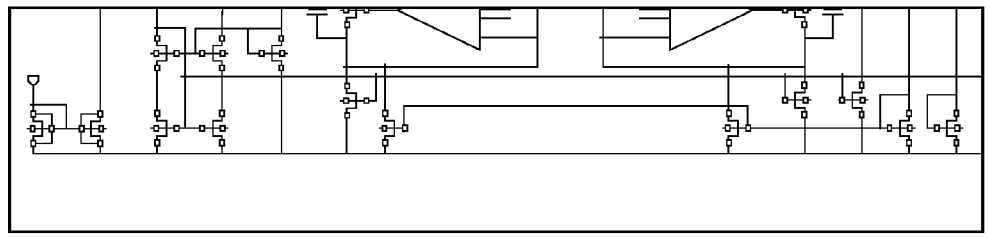
FIG. 18 is an illustrative drawing showing a portion of the schematic editor interface in which a first sub-circuit corresponding to the first sub-circuit shown selected in FIG. 17 is highlighted.

FIG. 17 is an illustrative drawing of the user interface of FIG. 16 showing the "Circuit Prospector" user selecting a first listed sub-circuit instance, (which matches the training set sub-circuit type) in accordance with some embodiments of the invention. FIG. 18 is an illustrative drawing showing a portion of the schematic editor interface in which a first sub-circuit corresponding to the first sub-circuit shown selected in FIG. 17 is highlighted.

Figure 19:
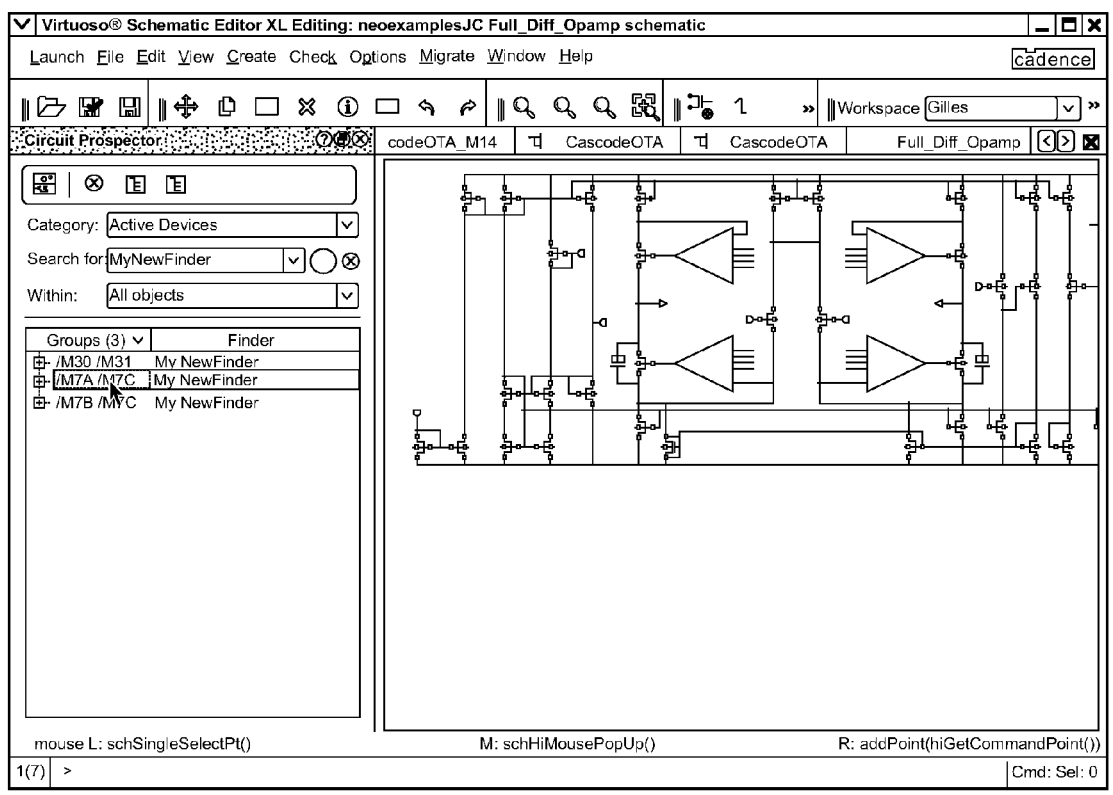
FIG. 19 is an illustrative drawing of the user interface of FIG. 16 showing the "Circuit Prospector" user selecting a second listed sub-circuit instance, (which matches the training set/sub-circuit type) in accordance with some embodiments of the invention.
Figure 20:
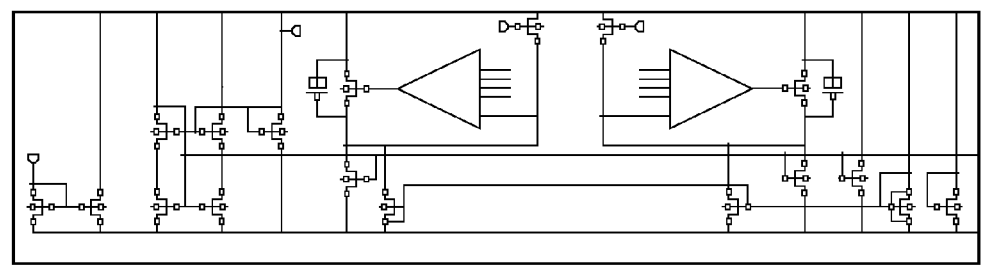
FIG. 20 is an illustrative drawing showing a portion of the schematic editor interface in which a second sub-circuit corresponding to the second sub-circuit shown selected in FIG. 19 is highlighted.

FIG. 19 is an illustrative drawing of the user interface of FIG. 16 showing the "Circuit Prospector" user selecting a second listed sub-circuit instance, (which matches the training set sub-circuit type) in accordance with some embodiments of the invention. FIG. 20 is an illustrative drawing showing a portion of the schematic editor interface in which a second sub-circuit corresponding to the second sub-circuit shown selected in FIG. 19 is highlighted.

Figure 21:
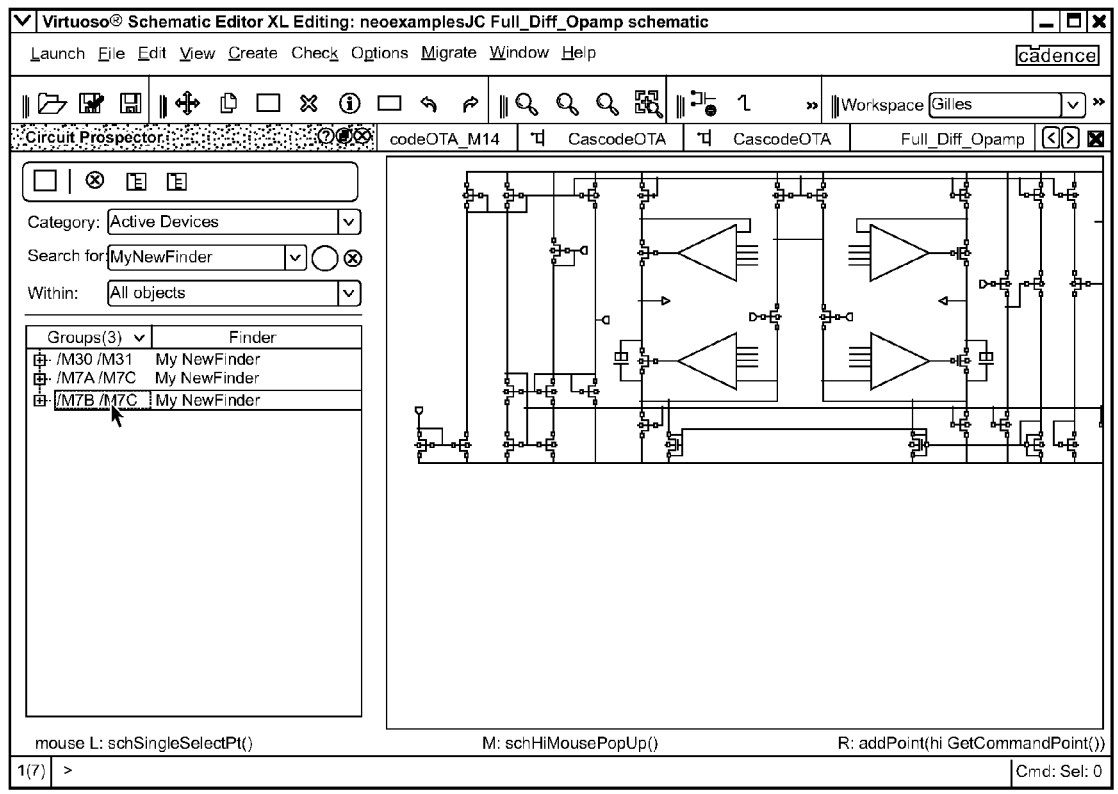
FIG. 21 is an illustrative drawing of the user interface of FIG. 16 showing the "Circuit Prospector" user selecting a third listed sub-circuit instance, (which matches the training set/sub-circuit type) in accordance with some embodiments of the invention.
Figure 22:
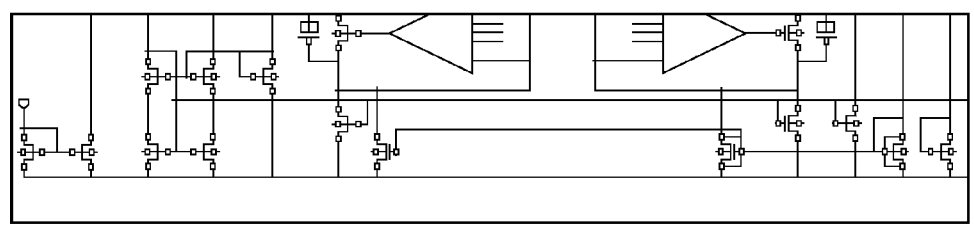
FIG. 22 is an illustrative drawing showing a portion of the schematic editor interface in which a third sub-circuit corresponding to the third sub-circuit shown selected in FIG. 21 is highlighted.

FIG. 21 is an illustrative drawing of the user interface of FIG. 16 showing the "Circuit Prospector" user selecting a third listed sub-circuit instance, (which matches the training set sub-circuit type) in accordance with some embodiments of the invention. FIG. 22 is an illustrative drawing showing a portion of the schematic editor interface in which a third sub-circuit corresponding to the third sub-circuit shown selected in FIG. 21 is highlighted.

Figure 23:
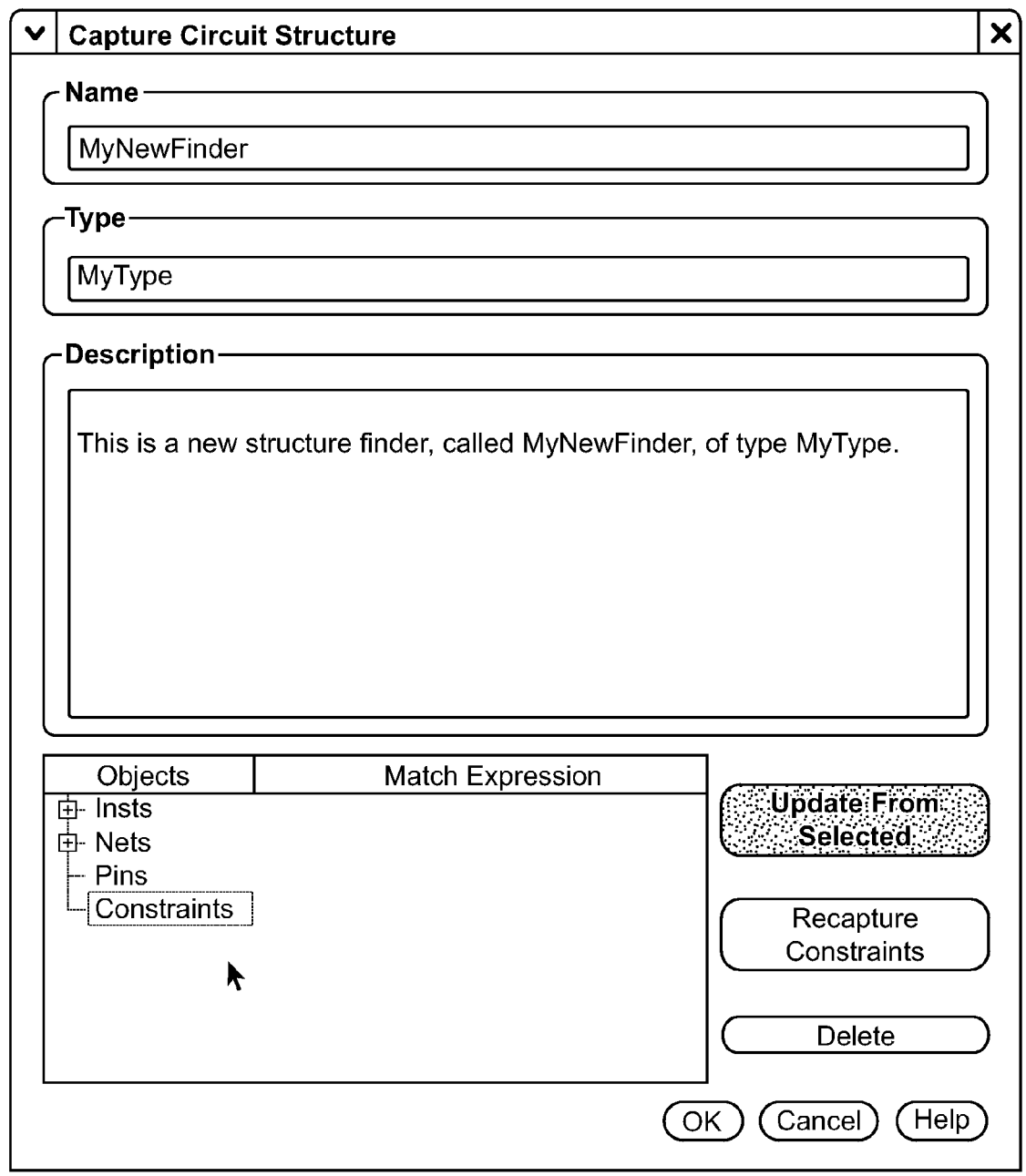
FIG. 23 is an illustrative drawing of an example "Capture Circuit Structure" user interface form, with no constraints, that is displayed in response to a first designer's actuating the "Capture Structure" toolbar button while selecting the sub-circuit as shown in FIGS. 8-9, in accordance with some embodiments of the invention.

FIG. 23 is an illustrative drawing of an example "Capture Circuit Structure" user interface form, with no constraints, that is displayed in response to a first designer's actuating the "Capture Structure" toolbar button while selecting the first listed sub-circuit as shown in FIG. 17, in accordance with some embodiments of the invention. In this example, the "Capture Circuit Structure" user interface has an unpopulated constraints field, as is the case when the first designer selects a sub-circuit type (i.e. Training Topology) which is not (yet) associated with any constraints.

Figure 24:
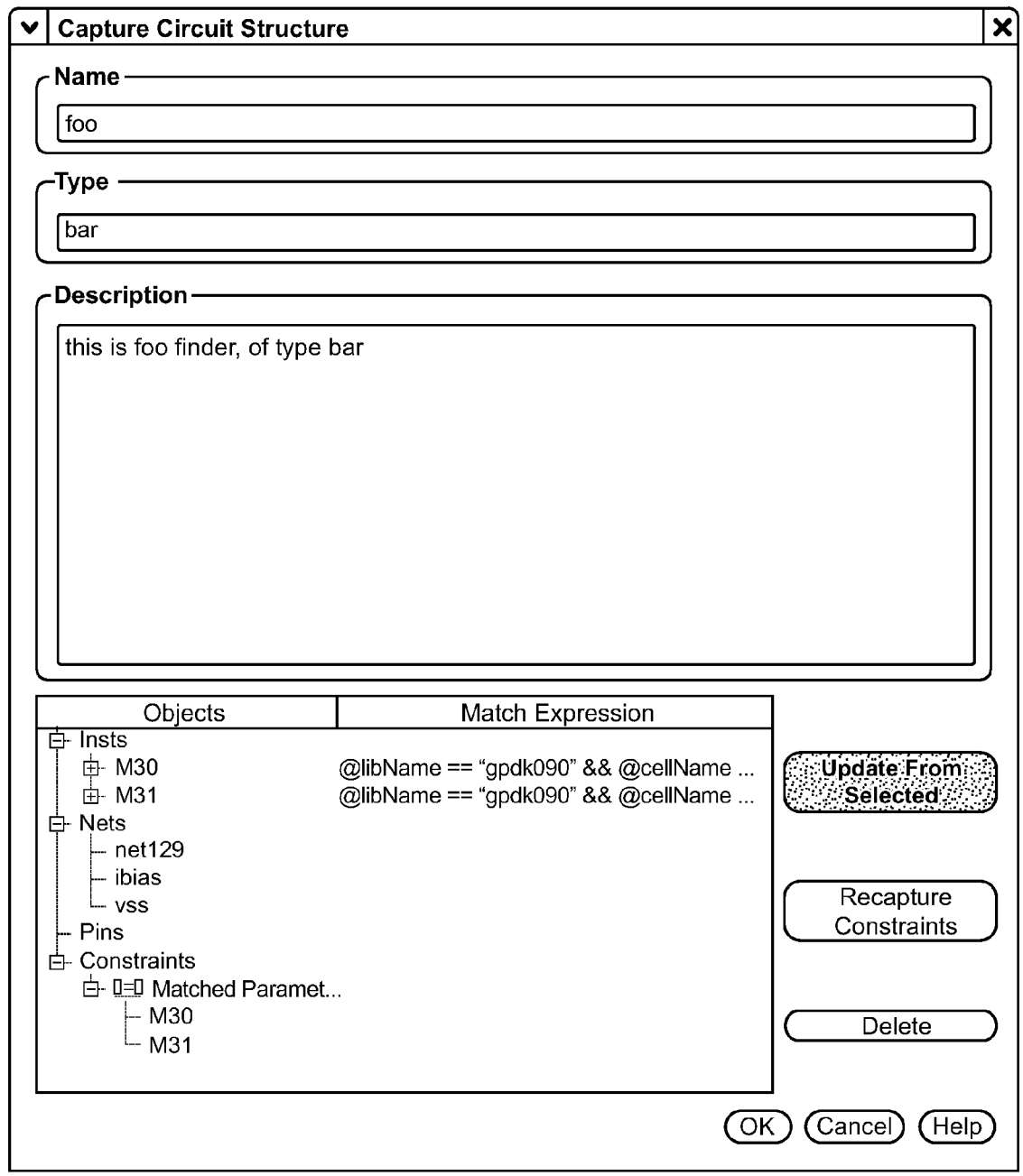
FIG. 24 is an illustrative drawing of an example "Capture Circuit Structure" user interface form, with constraints, that is displayed in response to a designer's actuating the "Capture Structure" toolbar button while selecting the sub-circuit as shown in FIGS. 8-9, where some constraints were previously entered and associated with that sub-circuit, in accordance with some embodiments of the invention.

FIG. 24 is an illustrative drawing of an example "Capture Circuit Structure" user interface form, with constraints, that is displayed in response to a designer's actuating the "Capture Structure" toolbar button while selecting the current mirror of FIGS. 8-9, in accordance with some embodiments of the invention. In this example, constraints had been created by the designer prior to actuating the "Capture Structure" toolbar button. The constraints were created apriori using the "Matched Parameters" Constraint Manager menu pick from the menu shown in FIG. 25. In this example, the "Capture Circuit Structure" user interface therefore has a pre-populated constraints field reflecting the prior set of associated constraints for the selected sub-circuit. In particular, in this example, transistors M30 and M31 have a "Matched Parameters" constraint indicating their Parameters are to be closely matched. At this point, the first designer may optionally further edit/modify that set of constraints, such that a modified set of constraints is saved and becomes a part of the information structure (i.e. plug-in) associated with the finder being defined in FIG. 24. To do so, the first designer would first modify the set of constraints on the selected objects using the menu of FIG. 25, and then click the "Recapture Constraints" button on the form of FIG. 24.

Also as shown in FIG. 24, the user has named this topology finder "foo" and has indicated that the Type is "bar" and has added a Description. The name foo as appears on the user interface screen, therefore serves as a user readable representation of the topology finder and its (modified) topology. Note here that other than the names, the finder named "MyNewFinder" is identical to the finder named "foo. These two finders have been named differently to simplify the explanation so as to be able to easily distinguish the case where the original selected subcircuit that had no prior constraints, from the case where it did have some prior constraints. As currently described, the default set of constraints to be applied to instances of "MyNewFinder" subcircuits is an empty set (i.e. no actual constraints will be applied when the user chooses "Create Default Constraints", whereas the default set of constraints to be applied to instances of "foo" subcircuits is the "Matched Parameter" constraint. That is the only difference between "myNewFinder" and "foo". The "foo" finder is therefore of more practical use.

Thus, it will be appreciated that during yet another portion of the learn by example stage 101 process illustrated with reference to FIGS. 23-24, a user may apply constraints to a specified sub-circuit type. The resulting topology finder (FIG. 24) corresponds to an information structure encoded in computer readable medium that provides topology; match expression; and constraint information that can be used during a subsequent find and apply stage 102.

Note also that during the learn by example stage 101, a first designer created the topology finder of FIG. 24 (foo) with reference to the teaching example sub-circuit/M30/M31. Later, during a find and apply stage 102, a second designer can invoke a "Circuit Prospector" process to use the created topology finder (i.e. the information structure containing topology, match expression and constraint) to locate other sub-circuit instances that match the topology and selected properties of the teaching example sub-circuit/M30/M31. In this example, the teaching example sub-circuit/M30/M31 serves as the specified sub-circuit type that is to be matched against and that possesses recommended default constraint(s). More particularly, the search involves use of an Isomorphic Graph algorithm and matching against a specified expression associated with the teaching example circuit by the first designer.

Moreover, it will be noted that multiple match criteria/expressions may be specified. Specifically, different match expressions can be specified for different constituents of a selected sub-circuit. For instance, a match expression can be specified based upon one or more of one or more properties of instances (e.g. transistors) within a sub-circuit type, one and/or more properties of a net within a sub-circuit type, one and/or more properties of pins within a sub-circuit type. Each such match expression must evaluate to true in order for the match to be made. Each constituent device or pin instance of a selected sub-circuit can have its own match expression which must evaluate to true. Each constituent net can have its own match expression which must evaluate to true. In the above examples, only a single match expression is discussed. However, referring to FIG. 24, it will be understood that there is a match expression for constituent device M30, and another match expression for constituent device M31 (which could be different). Although net 129, ibias and vss do not have match expressions in the example of FIG. 24, they could be added and edited by selecting them and then editing using the edit dialog of FIG. 14, for example.

FIGS. 25-28 illustrate example screen displays presented during the find and apply stage 102 in the course of interaction by a second designer to evaluate whether to accept, reject or modify constraint recommendations made by the first designer. Each of FIGS. 25-28 lists sub-circuit instances located as a result of the topology search and expression matching using the example foo topology finder. Three different groups of sub-circuit instances have been located: /M7B/M7C, /M30/M31 and /M7A/M7C. It will be understood that one of these (/M30/M31) is the teaching example sub-circuit used to create the foo topology finder. The other two (/M7B/M7C and M7A/M7C) were located through a search process using foo.

Figure 25:
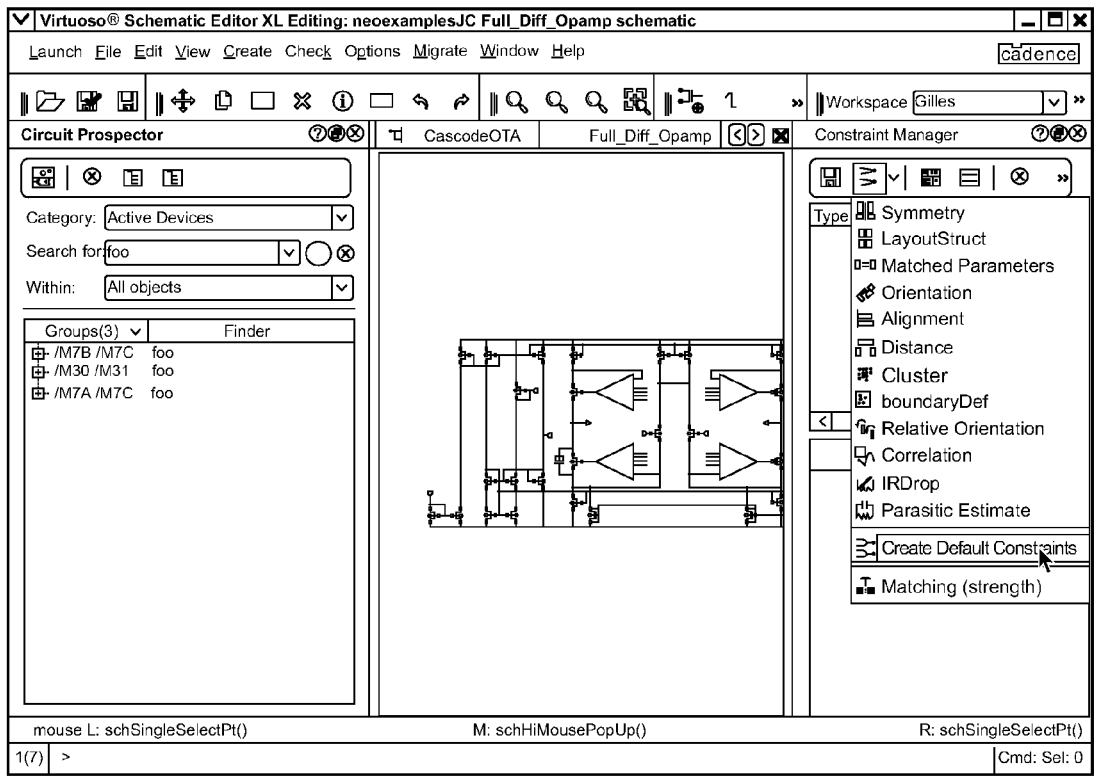
FIG. 25 is an illustrative drawing of a computer generated screen display including the "Circuit Prospector" user interface and a "Constraint Manager" user interface and a portion of a schematic editor canvas in between, in accordance with some embodiments of the invention.

FIG. 25 is an illustrative drawing of a computer generated screen display including the "Circuit Prospector" user interface and a "Constraint Manager" user interface and a portion of a schematic editor canvas in between, in accordance with some embodiments of the invention. The "Constraint Manager" user interface receives second designer input to manage creation, application and deletion of various types of constraints. The "Constraint Manager" user interface in this particular example includes a constraint menu, which when a dropdown arrow is selected provides a list of constraint selections, in terms of which constraints to apply to the selected set of objects in the Schematic Canvas. In this example, the user has highlighted so as to select the "Create Default Constraints" menu item. By doing so, the default constraints defined by the first designer will be automatically applied. Alternatively, the second designer could choose to ignore the defaults recommended by the first designer, and create some other constraints using the other choices in the menu.

Figure 26:
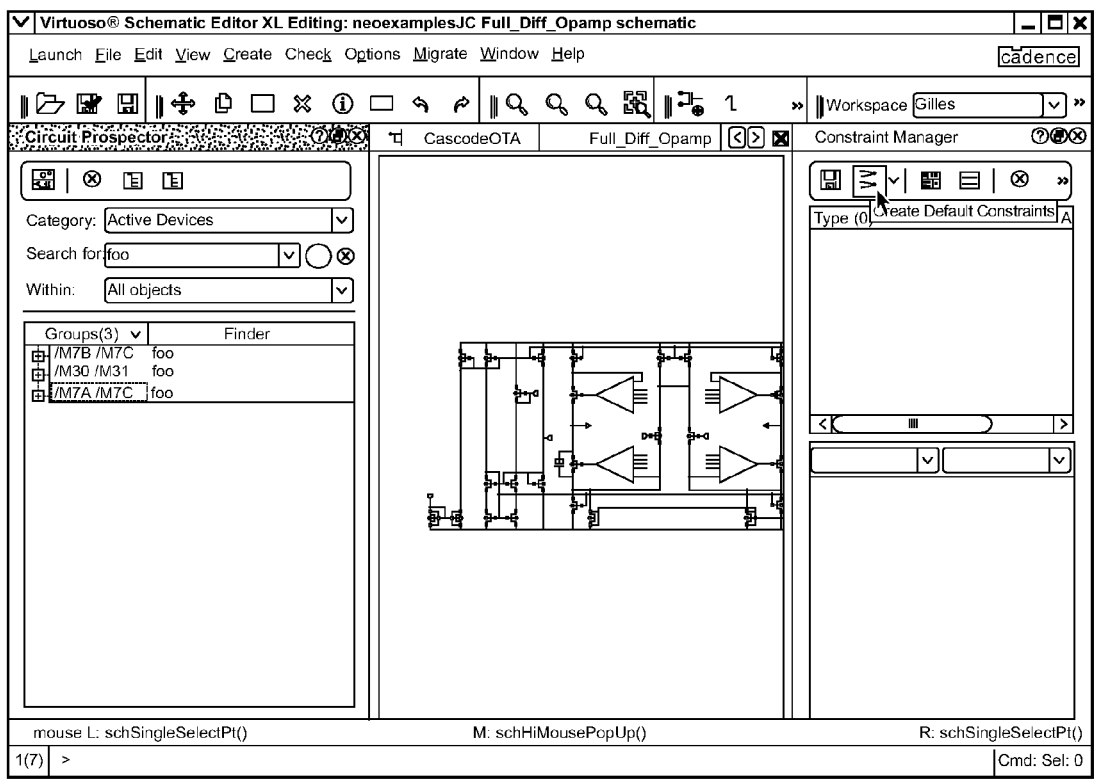
FIG. 26 is an illustrative drawing of the computer generated screen display environment of FIG. 25 in which a designer has selected all three groups of sub-circuit instances found by the "Circuit Prospector" to match the sub-circuit type specified by the designer as explained with reference to FIGS. 4-15, and is now about to apply the Default Constraints identified with reference to FIGS. 24-25, to them.

FIG. 26 is an illustrative drawing of an example computer generated screen display environment of FIG. 25 in which a second designer has selected all three groups of sub-circuit instances found by the "Circuit Prospector" to match the sub-circuit type specified by the first designer as explained with reference to FIGS. 4-15, and is now about to apply the Default Constraints identified with reference to FIG. 25, to all of them. The constraint to be applied corresponds to the constraint(s) that the first designer associated with the sub-circuit type training example as explained with reference to FIG. 24. Upon actuating the "Create Default Constraints" icon shown under the mouse pointer in the "Constraint Manager" shown on the right side of the screenshot of FIG. 26, the two "found" topologies i.e. pairs (M7B, M7C) and (M7A, M7C) will be constrained to have the same matching parameter constraint (along with parameter values, etc) as shown in FIG. 24 i.e. the same constraints as initially present in the teaching set. It will be understood, of course, that the second designer could select other constraints from the pull-down menu or could otherwise modify or reject the recommended constraint. Other software design tools used later in the flow (such as Circuit Design Optimization tools which resize transistors to meet circuit specifications during design centering) may then consume these constraints, such that if these tools decide to increase the width or length of one transistor of such a pair, they will automatically match the width/length parameters of the corresponding pair transistor to maintain the matched parameter relationship.

Figure 27:
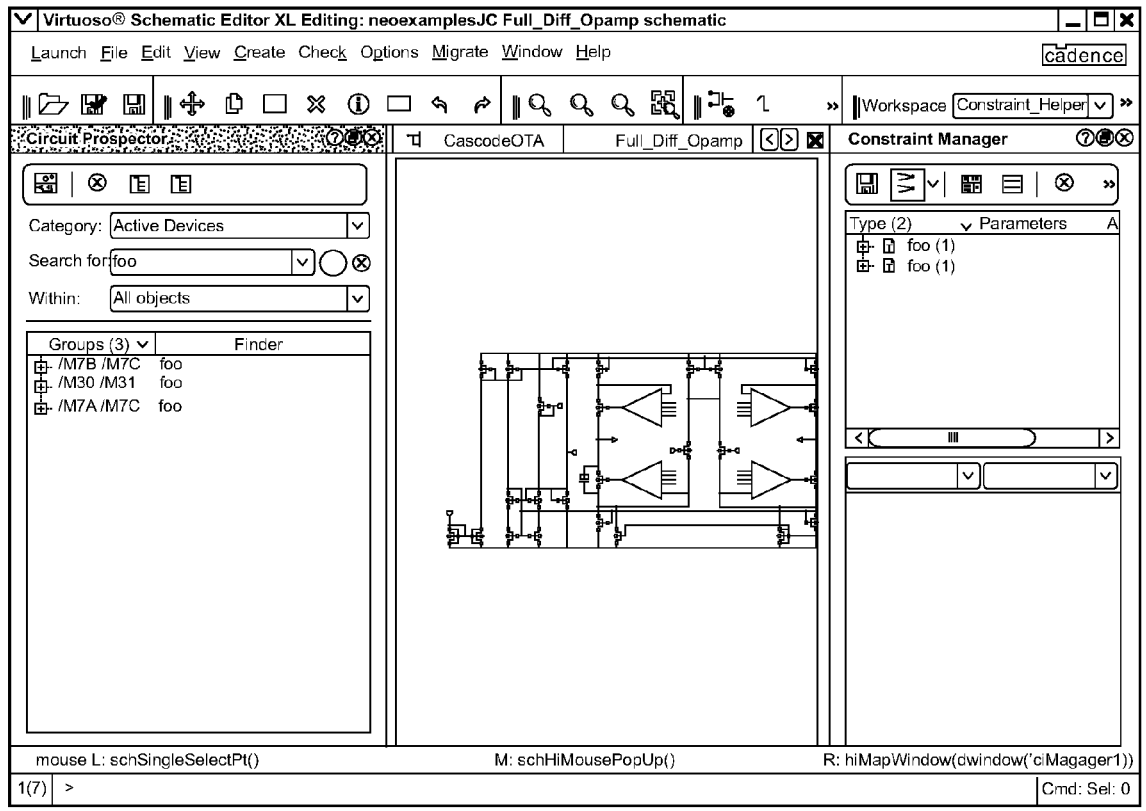
FIG. 27 is an illustrative drawing of the computer generated screen display environment of FIGS. 25-26 in showing the results of the application of constraints, in which two new Constraint groups have been created, both of type "foo" indicating their origination from the Topology Finder of the same name, created by the user.
Figure 28:
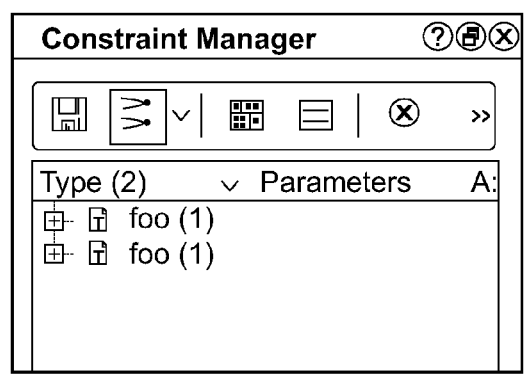
FIG. 28 is an illustrative drawing of a close-up of this screenshot showing the pertinent information is shown in FIG. 27.

FIG. 27 is an illustrative drawing of the computer generated screen display environment of FIGS. 25-26 in showing the results of the application of constraints, in which two new Constraint groups have been created, both of type "foo" indicating their origination from the Topology Finder of the same name, created by the user. Though not shown in the figure, the constraint groups of type "foo" could be expanded to show their contents, which in this case would be the "Matched Parameter" constraint shown in FIG. 24. FIG. 28 is an illustrative drawing of a close-up of this screenshot showing more clearly the pertinent information shown in FIG. 27.

It will be appreciated that embodiments of the invention involve use of a user interface system for teaching an EDA software tool of the new topologies. The user interface system is deliberately simple and intuitive to use, as is that for later application of the constraint to other examples of such topologies subsequently identified in an overall circuit design, which facilitates rapid constraint population enabling improved back end flows. Such 'teaching' occurs through a user's creation of an information structure plug-in representing a sub-circuit type and recommended constraints. Further, some embodiments of the invention employ a topology finder algorithm that can find other topology examples via connectivity alone, and is therefore independent of the drawn positions of the circuit elements. Some embodiments of the invention system can allow for exact matches or partial matches to be found in the searched set, by use of appropriately configured match expressions. This advantage allows the user to find similar-but-not-identical topologies to the Training Topology, where the similarity is sufficient to warrant the application of the same constraint set.

Figure 29:
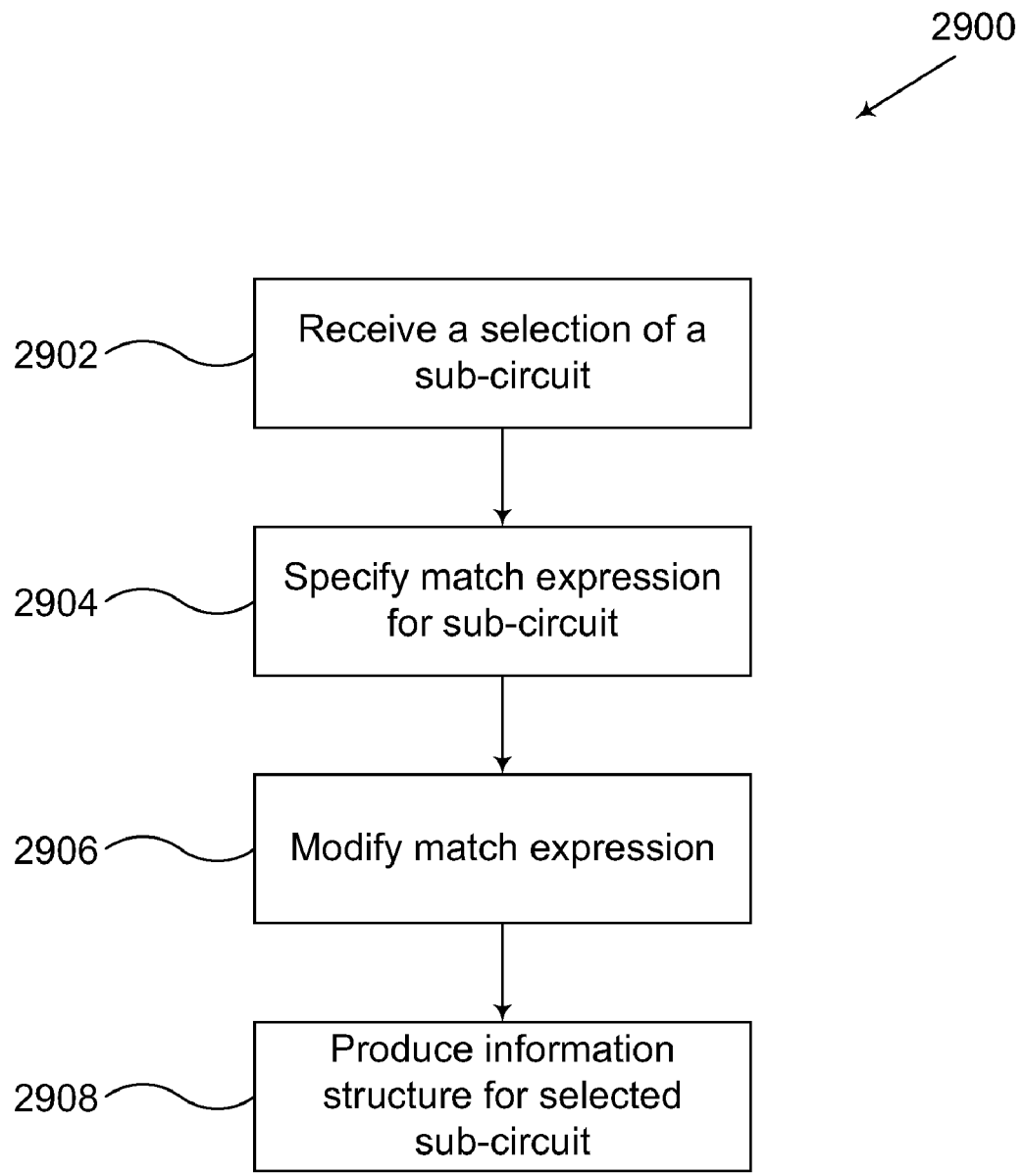
FIG. 29 shows an illustrative flow diagram of a computer implemented method of identifying sub-circuits in circuit designs in accordance with some embodiments of the invention.

Certain embodiments may be directed to the "learn by example" stage 101 of the embodiment of FIG. 1, where topologies, matching expressions, and constraints can be developed and saved (e.g., in a computer-readable medium) for further analysis of a circuit design as in the "find and apply" stage 100 of that same embodiment. For example, FIG. 29 shows an illustrative flow diagram of a computer implemented method 2900 of identifying sub-circuits in circuit designs in accordance with some embodiments of the invention. The method includes receiving a selection of a sub-circuit 2902; specifying a match expression for the sub-circuit, where the match expression characterizes matching properties of components (e.g., devices, nets, and pins) of the sub-circuit 2904; modifying the match expression to change the matching properties of components of the sub-circuit 2906; and producing an information structure in a computer readable medium, where the information structure associates a graph representing a topology of the selected sub-circuit with the modified match expression 2908. As discussed above, the information structure may also include one or more constraints for components of the sub-circuit. Modifying the match expression may include using a graphical user interface to edit a device name or a device-modeling file name for a device component of the sub-circuit.

The foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

The invention claimed is:

1. A computer-implemented method of identifying sub-circuits in circuit designs comprising:
   receiving a selection of a sub-circuit;
   generating a graph that specifies a topology for the sub-circuit;
   specifying a match expression for the sub-circuit, wherein the match expression characterizes matching properties of components of the sub-circuit;
   using a computer for modifying the match expression to change the matching properties of components of the sub-circuit;
   using the computer for producing an information structure in a computer-readable medium, wherein the information structure associates the graph with the modified match expression and the information structure includes a constraint group associated with the sub-circuit, the constraint group including one or more constraints for components of the sub-circuit;
   using the information structure to identify in a circuit design one or more sub-circuit instances having a topology corresponding to the graph and components corresponding to the modified match expression;
   using a graphical user interface to present one or more of the identified sub-circuit instances; and
   using the graphical user interface to receive instruction as to application of the constraint group to the one or more presented sub-circuit instances.

2. The method of claim 1, wherein the graph comprises a bipartite graph.

3. The method of claim 1, wherein receiving the selection of a sub-circuit includes using a graphical user interface to receive the selection from among sub-circuits in a displayed circuit design.

4. The method of claim 1, wherein the modified match expression is a first modified match expression that characterizes a first match criterion for the sub-circuit, and the method further comprises:
   receiving a second match expression for the sub-circuit, wherein the second match expression characterizes matching properties of components of the sub-circuit; and
   using the computer for modifying the second match expression to change the second matching properties of components of the sub-circuit and provide a second modified match expression that characterizes a second match criterion for the sub-circuit, wherein producing the information structure further includes producing such information structure that associates the graph representing a topology of the selected sub-circuit, and the first and second match criteria.

5. The method of claim 1, wherein modifying the match expression includes at least one of:
   narrowing a matching range for a device component of the sub-circuit, or
   broadening a matching range for a device component of the sub-circuit.

6. The method of claim 1, wherein modifying the match expression includes using a graphical user interface to edit a device name or a device-modeling file name for a device component of the sub-circuit.

7. The method of claim 1, wherein the sub-circuit components include one or more devices, nets or pins.

8. The method of claim 1, further comprising:
   using the graphical user interface to present a graphical representation of the information structure.

9. The method of claim 1, wherein specifying the match expression includes: using the computer for generating the match expression for a sub-circuit type having a topology specified by the graph for the selected sub-circuit.

10. The method of claim 1, further comprising:
    using the graphical user interface to edit the constraint group by selecting a constraint for the sub-circuit.

11. An article of manufacture encoded with computer readable code to cause a computer system to perform a method of identifying sub-circuits in circuit designs, the method comprising:
    receiving a selection of a sub-circuit;
    generating a graph that specifies a topology for the sub-circuit;
    specifying a match expression for the sub-circuit, wherein the match expression characterizes matching properties of components of the sub-circuit;
    modifying the match expression to change the matching properties of components of the sub-circuit;
    producing an information structure in a computer-readable medium, wherein the information structure associates the graph with the modified match expression and the information structure includes a constraint group associated with the sub-circuit, the constraint group including one or more constraints for components of the sub-circuit;
    using the information structure to identify in a circuit design one or more sub-circuit instances having a topology corresponding to the graph and components corresponding to the modified match expression;
    using a graphical user interface to present one or more of the identified sub-circuit instances; and
    using the graphical user interface to receive instruction as to application of the constraint group to the one or more presented sub-circuit instances.

12. The article of manufacture of claim 11, wherein the graph comprises a bipartite graph.

13. The article of manufacture of claim 11, wherein receiving the selection of a sub-circuit includes using a graphical user interface to receive the selection from among sub-circuits in a displayed circuit design.

14. The article of manufacture of claim 11, wherein the modified match expression is a first modified match expression that characterizes a first match criterion for the sub-circuit, and the method further comprises:
    receiving a second match expression for the sub-circuit, wherein the second match expression characterizes matching properties of components of the sub-circuit; and
    modifying the second match expression to change the second matching properties of components of the sub-circuit and provide a second modified match expression that characterizes a second match criterion for the sub-circuit, wherein producing the information structure further includes producing such information structure that associates the graph representing a topology of the selected sub-circuit, and the first and second match criteria.

15. The article of manufacture of claim 11, wherein modifying the match expression includes at least one of:
    narrowing a matching range for a device component of the sub-circuit, or
    broadening a matching range for a device component of the sub-circuit.

16. The article of manufacture of claim 11, wherein modifying the match expression includes using a graphical user interface to edit a device name or a device-modeling file name for a device component of the sub-circuit.

17. The article of manufacture of claim 11, wherein the sub-circuit components include one or more devices, nets or pins.

18. The article of manufacture of claim 11, wherein the method further comprises:
using the graphical user interface to present a graphical representation of the information structure.

19. The article of manufacture of claim 11, wherein specifying the match expression includes: generating the match expression for a sub-circuit type having a topology specified by the graph for the selected sub-circuit.

20. The article of manufacture of claim 11, wherein the method further comprises:
using the graphical user interface to edit the constraint group by selecting a constraint for the sub-circuit.

21. A computer system including a processor with memory and a computer-program medium that stores executable instructions for performing a method of identifying sub-circuits in circuit designs, the method comprising:
receiving a selection of a sub-circuit;
generating a graph that specifies a topology for the sub-circuit;
specifying a match expression for the sub-circuit, wherein the match expression characterizes matching properties of components of the sub-circuit;
modifying the match expression to change the matching properties of components of the sub-circuit;
producing an information structure in a computer-readable medium, wherein the information structure associates the graph with the modified match expression and the information structure includes a constraint group associated with the sub-circuit, the constraint group including one or more constraints for components of the sub-circuit;
using the information structure to identify in a circuit design one or more sub-circuit instances having a topology corresponding to the graph and components corresponding to the modified match expression;
using a graphical user interface to present one or more of the identified sub-circuit instances; and
using the graphical user interface to receive instruction as to application of the constraint group to the one or more presented sub-circuit instances.

22. The computer system of claim 21, wherein receiving the selection of a sub-circuit includes using a graphical user interface to receive the selection from among sub-circuits in a displayed circuit design.

23. The computer system of claim 21, wherein the modified match expression is a first modified match expression that characterizes a first match criterion for the sub-circuit, and the method further comprises:
receiving a second match expression for the sub-circuit, wherein the second match expression characterizes matching properties of components of the sub-circuit; and
modifying the second match expression to change the second matching properties of components of the sub-circuit and provide a second modified match expression that characterizes a second match criterion for the sub-circuit, wherein producing the information structure further includes producing such information structure that associates the graph representing a topology of the selected sub-circuit, and the first and second match criteria.

24. The computer system of claim 21, wherein modifying the match expression includes at least one of:
narrowing a matching range for a device component of the sub-circuit, or
broadening a matching range for a device component of the sub-circuit.

25. The computer system of claim 21, wherein modifying the match expression includes using a graphical user interface to edit a device name or a device-modeling file name for a device component of the sub-circuit.

26. The computer system of claim 21, wherein the method further comprises:
using the graphical user interface to present a graphical representation of the information structure.

* * * * *

UNITED STATES PATENT AND TRADEMARK OFFICE
CERTIFICATE OF CORRECTION

PATENT NO. : 7,735,036 B2  Page 1 of 1
APPLICATION NO. : 11/745983
DATED : June 8, 2010
INVENTOR(S) : Ian C. Dennison et al.

It is certified that error appears in the above-identified patent and that said Letters Patent is hereby corrected as shown below:

In column 1, line 19, delete "FDA" and insert -- EDA --, therefor.

In column 3, line 13, delete "non-fictional" and insert -- non-functional --, therefor.

In column 12, line 20, delete "Net3." and insert -- Net1. --, therefor.

In column 12, line 42, delete "FIG. 31." and insert -- FIG. 3B. --, therefor.

In column 12, line 46, delete "FIG. 38." and insert -- FIG. 3B. --, therefor.

In column 12, line 60, delete "identity" and insert -- identify --, therefor.

In column 13, line 48, after "271" insert -- . --.

In column 20, line 24, delete "expressions." and insert -- expression. --, therefor.

Signed and Sealed this

Fifth Day of October, 2010

David J. Kappos
*Director of the United States Patent and Trademark Office*